(12) United States Patent
Masuda

(10) Patent No.: US 9,075,604 B2
(45) Date of Patent: Jul. 7, 2015

(54) DEVICE AND METHOD FOR DETERMINING WHETHER TO HOLD DATA IN A MEMORY AREA BEFORE TRANSITIONING TO A POWER SAVING STATE

(75) Inventor: Takeshi Masuda, Nagano (JP)

(73) Assignee: SONY CORPORATION, Tokyo (JP)

( * ) Notice: Subject to any disclaimer, the term of this patent is extended or adjusted under 35 U.S.C. 154(b) by 63 days.

(21) Appl. No.: 13/187,622

(22) Filed: Jul. 21, 2011

(65) Prior Publication Data

US 2012/0036381 A1 Feb. 9, 2012

(30) Foreign Application Priority Data

Aug. 4, 2010 (JP) ................ P2010-175635

(51) Int. Cl.
  *G06F 1/00* (2006.01)
  *G06F 1/26* (2006.01)
  *G06F 1/32* (2006.01)

(52) U.S. Cl.
  CPC ............ *G06F 1/3203* (2013.01); *G06F 1/3275* (2013.01); *Y02B 60/32* (2013.01); *Y02B 60/1228* (2013.01)

(58) Field of Classification Search
  CPC ... Y02B 60/32; Y02B 60/1225; G06F 1/3203
  USPC .......................................................... 713/2
  See application file for complete search history.

(56) References Cited

U.S. PATENT DOCUMENTS

| | | | |
|---|---|---|---|
| 5,524,248 A * | 6/1996 | Parks et al. | 713/324 |
| 5,845,134 A | 12/1998 | Arai | |
| 5,928,365 A | 7/1999 | Yoshida | |
| 5,944,828 A | 8/1999 | Matsuoka | |
| 6,199,139 B1 | 3/2001 | Katayama et al. | |
| 6,327,664 B1 | 12/2001 | Dell et al. | |
| 6,446,213 B1 | 9/2002 | Yamaki | |
| 6,820,169 B2 * | 11/2004 | Wilcox et al. | 711/105 |
| 7,003,639 B2 * | 2/2006 | Tsern et al. | 711/154 |
| 7,100,013 B1 * | 8/2006 | de Waal | 711/170 |
| 7,590,815 B1 * | 9/2009 | de Waal | 711/170 |
| 7,681,058 B2 | 3/2010 | Kimura | |
| 7,934,111 B2 | 4/2011 | Yamaji | |
| 8,200,999 B2 * | 6/2012 | Huizenga et al. | 713/320 |
| 2002/0087816 A1 * | 7/2002 | Atkinson et al. | 711/156 |
| 2002/0138669 A1 * | 9/2002 | Kadatch et al. | 710/5 |
| 2003/0023825 A1 * | 1/2003 | Woo et al. | 711/170 |

(Continued)

FOREIGN PATENT DOCUMENTS

| | | |
|---|---|---|
| JP | 6-138987 A | 5/1994 |
| JP | 8335193 | 12/1996 |

(Continued)

OTHER PUBLICATIONS

European Search Report EP 11175440, dated Apr. 4, 2012.

(Continued)

*Primary Examiner* — Thomas Lee
*Assistant Examiner* — Robert Cassity
(74) *Attorney, Agent, or Firm* — Hazuki International, LLC

(57) ABSTRACT

There is provided an information processing device including a memory, an OS that acquires location information of data stored in the memory, and a BIOS that performs power control to cause the memory to transition to a power saving state with reference to the location information acquired by the OS.

20 Claims, 22 Drawing Sheets

(56) References Cited

U.S. PATENT DOCUMENTS

| | | |
|---|---|---|
| 2004/0128568 A1* | 7/2004 | O'Shea .................. 713/300 |
| 2006/0059380 A1 | 3/2006 | Kimura |
| 2007/0005998 A1* | 1/2007 | Jain et al. ............... 713/300 |
| 2007/0150760 A1* | 6/2007 | Nowlin .................. 713/300 |
| 2008/0034234 A1 | 2/2008 | Shimizu et al. |
| 2008/0162970 A1 | 7/2008 | Yamaji |
| 2010/0131789 A1 | 5/2010 | Kimura |
| 2010/0174934 A1* | 7/2010 | Zhao et al. ............. 713/324 |

FOREIGN PATENT DOCUMENTS

| | | |
|---|---|---|
| JP | 9-212416 A | 8/1997 |
| JP | 10-097353 A | 4/1998 |
| JP | 10-333997 A | 12/1998 |
| JP | 11-085335 A | 3/1999 |
| JP | 11-213659 A | 8/1999 |
| JP | 2000-081921 A | 3/2000 |
| JP | 2000-172386 A | 6/2000 |
| JP | 2000-339216 A | 12/2000 |
| JP | 2002-099502 A | 4/2002 |
| JP | 2004-171660 A | 6/2004 |
| JP | 2006-079468 A | 3/2006 |
| JP | 2008-040606 A | 2/2008 |
| JP | 2008-165585 A | 7/2008 |
| JP | 2008-262451 A | 10/2008 |
| JP | 2009-080821 A | 4/2009 |
| JP | 2009-258925 A | 11/2009 |
| WO | 2006072040 A2 | 7/2006 |
| WO | 2007072435 A2 | 6/2007 |

OTHER PUBLICATIONS

Office Action from Japanese Application No. 2010-175635, dated Apr. 15, 2014.

* cited by examiner

FIG. 5

Firmware ACPI Control Structure (FACS)

| Field | Byte Length | Byte Offset |
|---|---|---|
| Signature | 4 | 0 |
| Length | 4 | 4 |
| Hardware Signature | 4 | 8 |
| Firmware Waking Vector | 4 | 12 |
| Global Lock | 4 | 16 |
| Flags | 4 | 20 |
| X Firmware Waking Vector | 8 | 24 |
| Version | 1 | 32 |
| Reserved | 3 | 33 |
| OSPM Flags | 4 | 36 |
| Preservation Map Address | 8 | 40 |
| Reserved | 16 | 48 |

Firmware Control Structure Feature Flags

| Flag | Bit Length | Bit Offset |
|---|---|---|
| 64BIOS_F | 1 | 0 |
| 64BIT_WAKE_SUPPORTED_F | 1 | 1 |
| PRESERVATION_MAP_SUPPORTED_F | 1 | 2 |
| Reserved | 29 | 3 |

OSPM Enabled Firmware Control Structure Feature Flags

| Flag | Bit Length | Bit Offset |
|---|---|---|
| 64BIT_WAKE_F | 1 | 0 |
| PRESERVATION_MAP_F | 1 | 1 |
| Reserved | 30 | 2 |

DEVICE AND METHOD FOR DETERMINING WHETHER TO HOLD DATA IN A MEMORY AREA BEFORE TRANSITIONING TO A POWER SAVING STATE

CROSS-REFERENCE TO RELATED APPLICATION

The present application claims priority from Japanese Patent Application No. JP 2010-175635 filed in the Japanese Patent Office on Aug. 4, 2010, the entire content of which is incorporated herein by reference.

BACKGROUND

The disclosure relates to an information processing device, a power control method, and a program.

A wide variety of information processing devices such as a PC (Personal Computer), a mobile phone and a game machine are in widespread use today. Such an information processing device includes a CPU (Central Processing Unit) and a memory, and the CPU uses the memory as a work area, so that an OS (Operating System), an application program or the like runs.

Further, with the widespread of portable information processing devices, technology related to reduction of power consumption of information processing devices is receiving attention. For example, as a power saving state to reduce power consumption during nonuse of information processing devices, a suspend state, a hibernation state or the like is known.

The suspend state is a state that turns off or stops devices such as CPU, HDD (Hard Disk Drive) and LCD (Liquid Crystal Display) with data maintained in a memory, to thereby reduce power consumption of an entire device. In the suspend state, because data is held in the memory as described above, the information processing device can quickly return to the normal operation state from the suspend state. However, in the suspend state, power for the memory to perform self-refresh is consumed. Note that refresh operation is disclosed in Japanese Unexamined Patent Application Publication No. 2004-171660, for example.

On the other hand, the hibernation state is a state that turns off or stops a memory in addition to devices such as CPU, HDD and LCD after saving data in the memory into a nonvolatile memory such as HDD. Because it is possible in the hibernation state to completely power off the information processing device, the hibernation state has an advantage that it can reduce power consumption more than the suspend state does. However, because data of the memory is saved in the nonvolatile memory such as HDD, it takes more time to return to the normal operation state from the hibernation state than to return to the normal operation state from the suspend state.

SUMMARY

In general, determination about a transition from the normal state to the power saving state is made by the OS, and power control of the CPU, memory or the like is performed by BIOS (Basic Input Output System) based on the determination made by the OS.

However, although the BIOS can control a memory configuration, a memory controller, a peripheral circuit or the like, it does not grasp the location of programs, data and so on that are managed on the memory by the OS. Therefore, because the BIOS makes control so that the entire memory performs self-refresh at the transition to the suspend state, there arises a case where power is unnecessarily consumed in the memory. Further, because the BIOS controls the transition to the hibernation state so as to save the whole data in the memory into a nonvolatile memory, there occurs a problem that it takes a long time to transition to the hibernation state and return from the hibernation state.

In light of the foregoing, it is desirable to provide novel and improved information processing device, power control method, and program in which a BIOS can perform power control by referring to location information of data stored in a memory.

According to an embodiment of the present disclosure, there is provided an information processing device including a memory, an OS that acquires location information of data stored in the memory, and a BIOS that performs power control to cause the memory to transition to a power saving state with reference to the location information acquired by the OS.

The memory may be made up of a plurality of memory areas, and the BIOS may include a memory state control unit that performs power control of the memory with respect to each of the plurality of memory areas.

The memory state control unit may make control to perform self-refresh for memory areas where hold data to be held in the power saving state exists and not to perform self-refresh for other memory areas among the plurality of memory areas.

The BIOS may include a location change unit that changes a location of the hold data so as to reduce a number of memory areas storing the hold data with reference to the location information acquired by the OS, and the memory state control unit may perform power control of the memory based on the location of the hold data after location change by the location change unit.

The BIOS may include a compression unit that compresses the hold data, and the memory state control unit may perform power control of the memory based on the location of the hold data after location change by the location change unit and data compression by the compression unit.

The memory state control unit may perform power control to return the memory from the power saving state, and at return from the power saving state, the location change unit may change the location of the hold data back to a location before transition to the power saving state.

The OS may include a location change unit that changes a location of the hold data so as to reduce a number of memory areas storing the hold data, and a data location check unit that acquires location information of data after location change by the location change unit.

The OS may include a compression unit that compresses the hold data, and the data location check unit may acquire location information of data after location change by the location change unit and data compression by the compression unit.

The memory state control unit may perform power control to return the memory from the power saving state, and at return from the power saving state, the location change unit may change the location of the hold data back to a location before transition to the power saving state.

The information processing device may further include a nonvolatile storage medium. The BIOS may include a recording control unit that records hold data to be held in the power saving state into the nonvolatile storage medium by using the location information acquired by the OS, and a memory state control unit that stops power supply to the memory and causes the memory to transition to the power saving state.

The BIOS may include a location change unit that concentrates the hold data on one part of the memory with reference to the location information acquired by the OS, and the recording control unit may perform control to record the hold data concentrated on one part of the memory by the location change unit into the nonvolatile storage medium.

The BIOS may include a compression unit that compresses the hold data, and the recording control unit may perform control to record the hold data after processing by the location change unit and the compression unit into the nonvolatile storage medium.

The memory state control unit may perform power control to return the memory from the power saving state, and at return from the power saving state, the location change unit may change the location of the hold data back to a location before transition to the power saving state.

The OS may include a location change unit that concentrates the hold data on one part of the memory, and a data location check unit that acquires location information of data after processing by the location change unit.

The OS may include a compression unit that compresses the hold data, and the data location check unit may acquire location information of data after processing by the location change unit and the compression unit.

The location information may contain information indicating a located position of each data in the memory and information indicating whether each data is the hold data.

The BIOS may further include a flag setting unit that sets a flag indicating presence of a function to perform power control based on the location information, and the OS may acquire the location information when the flag is set by the BIOS.

The OS may further include a flag setting unit that sets a flag indicating whether the location information is acquired at transition to the power saving state, and the BIOS may perform power control based on the location information when the flag is set by the OS.

According to another embodiment of the present disclosure, there is provided a power control method including acquiring location information of data stored in a memory included in an information processing device by an OS, and performing power control to cause the memory to transition to a power saving state by a BIOS with reference to the location information acquired by the OS.

According to another embodiment of the present disclosure, there is provided a program causing a computer to execute, acquiring location information of data stored in a memory by an OS; and performing power control to cause the memory to transition to a power saving state by a BIOS with reference to the location information acquired by the OS.

According to the embodiments of the present disclosure described above, a BIOS can perform power control by referring to location information of data stored in a memory.

BRIEF DESCRIPTION OF THE DRAWINGS

FIG. 5 is an explanatory diagram showing a configuration example of FACS according to the embodiment;

DETAILED DESCRIPTION OF THE EMBODIMENT(S)

Figure 1:
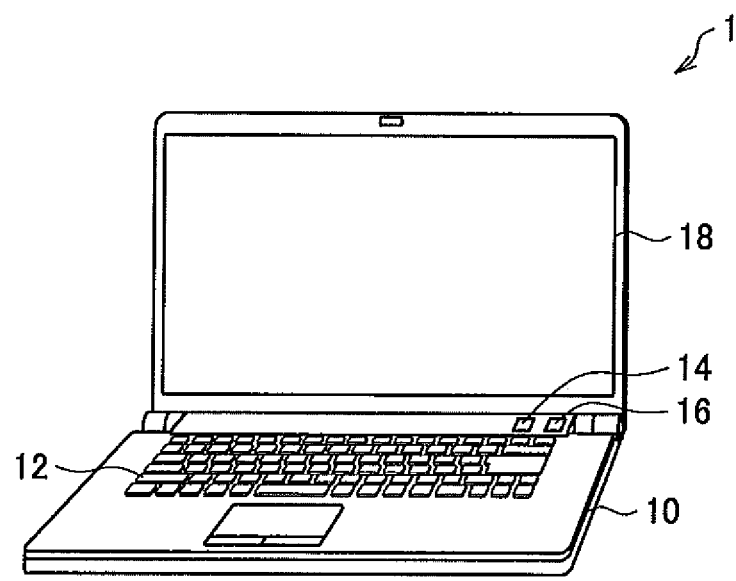
FIG. 1 is an explanatory diagram showing an appearance of an information processing device according to an embodiment of the disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

In this specification and the drawings, a plurality of structural elements having substantially the same function are distinguished from one another by affixing different alphabetical letters to the same reference numeral in some cases. However, when there is no particular need to distinguish between a plurality of structural elements having the same function, they are denoted by the same reference numeral.

Preferred embodiments of the disclosure will be described hereinafter in the following order.

1. Basic Configuration of Information Processing Device
2. First Embodiment
2-1. Functions of OS and BIOS According to First Embodiment
2-2. Operations of OS and BIOS According to First Embodiment
3. Second Embodiment
3-1. Functions of OS and BIOS According to Second Embodiment
3-2. Operations of OS and BIOS According to Second Embodiment
4. Third Embodiment
4-1. Functions of OS and BIOS According to Third Embodiment
4-2. Operations of BIOS According to Third Embodiment
5. Fourth Embodiment
5-1. Functions of OS and BIOS According to Fourth Embodiment
5-2. Operations of BIOS According to Fourth Embodiment
6. Summary <1. Basic Configuration of Information Processing Device>

The present disclosure is implemented in various ways as described in detail in "2. First Embodiment" to "5. Fourth Embodiment" by way of illustration. Further, an information processing device according to each embodiment includes a memory, an OS that acquires a preservation map, which is location information of data stored in the memory, and a BIOS that performs power control to cause the memory to transition to a power saving state such as a suspend state or a hibernation state by referring to the preservation map. In the following, a basic configuration that is common to information processing devices according to the respective embodiments is described firstly with reference to FIGS. 1 to 3.

(Appearance of Information Processing Device)

FIG. 1 is an explanatory diagram showing an appearance of an information processing device 1 according to an embodiment of the disclosure. Referring to FIG. 1, the information processing device 1 according to the embodiment of the disclosure includes a main unit 10, a keyboard 12, a power switch 14, a transition switch 16, and an LCD 18. Note that, although a PC (Personal Computer) is shown as an example of the information processing device 1 in FIG. 1, the information processing device 1 is not limited to a PC. For example, the information processing device 1 may be a home video processing device (e.g. DVD recorder, videocassette recorder etc.), a PDA (Personal Digital Assistants), a home game device, an electrical household appliance, a mobile phone, a portable music player, a portable video processing device, a portable game device or the like.

The main unit 10 is a cabinet that houses hardware such as a CPU 20, a memory 26 and an HDD 28, which are described later with reference to FIG. 2. The keyboard 12, the power switch 14 and the transition switch 16 are mounted on the main unit 10.

The keyboard 12 detects input operation of information or instructions by a user. The power switch 14 and the transition switch 16 are buttons to be pressed by a user. The information processing device 1 starts operating when the power switch 14 is pressed by a user, and makes an operating state transition when the transition switch 16 is pressed by a user. Note that the operating state includes a normal operation state, a suspend state, a hibernation state, a shutdown state and so on, as described later with reference to FIG. 3. Further, a trigger for the information processing device 1 to make an operating state transition is not limited to pressing of the transition switch 16 by a user. For example, the information processing device 1 may make an operating state transition to the suspend state when a user operation is not detected for a long time during the normal operation state.

The LCD 18 functions as a display unit that displays a display screen that is produced in the information processing device 1. Note that the LCD 18 is just an example of the display unit, and the display unit may be a CRT (Cathode Ray Tube) display device or an OLED (Organic Light Emitting Diode) device.

The appearance configuration of the information processing device 1 is described above with reference to FIG. 1. Next, an internal configuration of the information processing device 1 is described with reference to FIG. 2.

(Internal Configuration of Information Processing Device)

Figure 2:
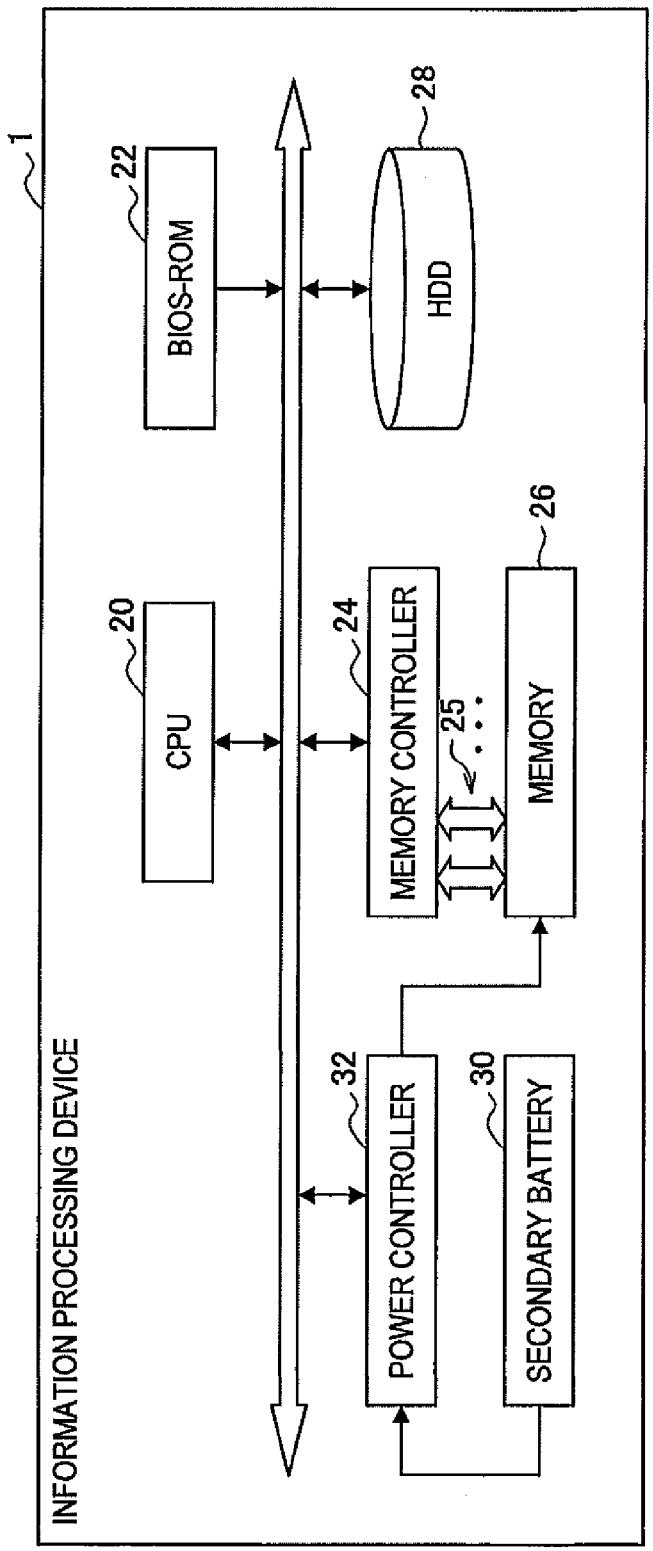
FIG. 2 is an explanatory diagram showing an internal configuration of the information processing device.

FIG. 2 is an explanatory diagram showing an internal configuration of the information processing device 1. Referring to FIG. 2, the information processing device 1 includes a CPU 20, a BIOS-ROM 22, a memory controller 24, a plurality of memory buses 25, a memory 26, an HDD 28, a secondary battery 30, and a power controller 32.

The CPU 20 is a main processor that controls the information processing device 1 and executes an OS or an application program that is loaded from the HDD 28 into the memory 26. Further, the CPU 20 executes a BIOS that is loaded from the BIOS-ROM 22 into the memory 26.

The BIOS-ROM 22 is a nonvolatile memory that stores a BIOS to be executed by the CPU 20. The BIOS has a function (program group) to control hardware such as the keyboard 12, the memory controller 24 and the HDD 28 in the information processing device 1. Further, the BIOS has a function to power supply to each hardware at an operating state transition of the information processing device 1. Power control by the BIOS is described in detail later in "2. First Embodiment" to "5. Fourth Embodiment".

The memory controller 24 controls writing of data to the memory 26, reading of data form the memory 26 and so on according to an instruction from the CPU 20. For the memory 26, a DRAM whose principle of operation is to store one-bit information depending on the presence or absence of charge in a capacitor is used, for example. Further, charge in a capacitor is lost with the lapse of time. Therefore, during normal operation, the memory controller 24 controls a refresh operation that recharges each capacitor in the memory 26 on a regular basis.

The memory 26 is a volatile memory that is used as a work area by the CPU 20. Because the memory 26 is connected to the memory controller 24 through a plurality of memory buses 25 as shown in FIG. 2, it is possible to input and output multiple sequence data in a parallel fashion.

Further, the memory 26 is composed of a plurality of memory areas whose power state is independently controllable. A unit of the memory area may be a channel which is a region corresponding to one memory bus, a rank or a bank which is a smaller area than the channel or the like. For example, when the memory 26 is composed of a channel A and a channel B, it is possible to perform control in such a way that power is supplied to the channel A while power is not supplied to the channel B.

The HDD 28 is a magnetic storage device and stores an OS and various application programs to be executed by the CPU 20. Note that the HDD 28 is just an example of the nonvolatile memory, and the nonvolatile memory included in the information processing device 1 is not limited to the HDD 28.

The secondary battery 30 is a battery that supplies power necessary for each hardware of the information processing device 1 to operate. Note that, when connected to an AC adapter, the information processing device 1 may operate based on power supply from the AC adapter.

The power controller 32 controls power supply to hardware such as the CPU 20, the memory 26 and the LCD 18 by taking an instruction from the CPU 20, if any, into consideration. Power control that is performed by the power controller 32 in each operating state of the information processing device 1 is described hereinafter with reference to FIG. 3.

(State Transition of Information Processing Device)

Figure 3:
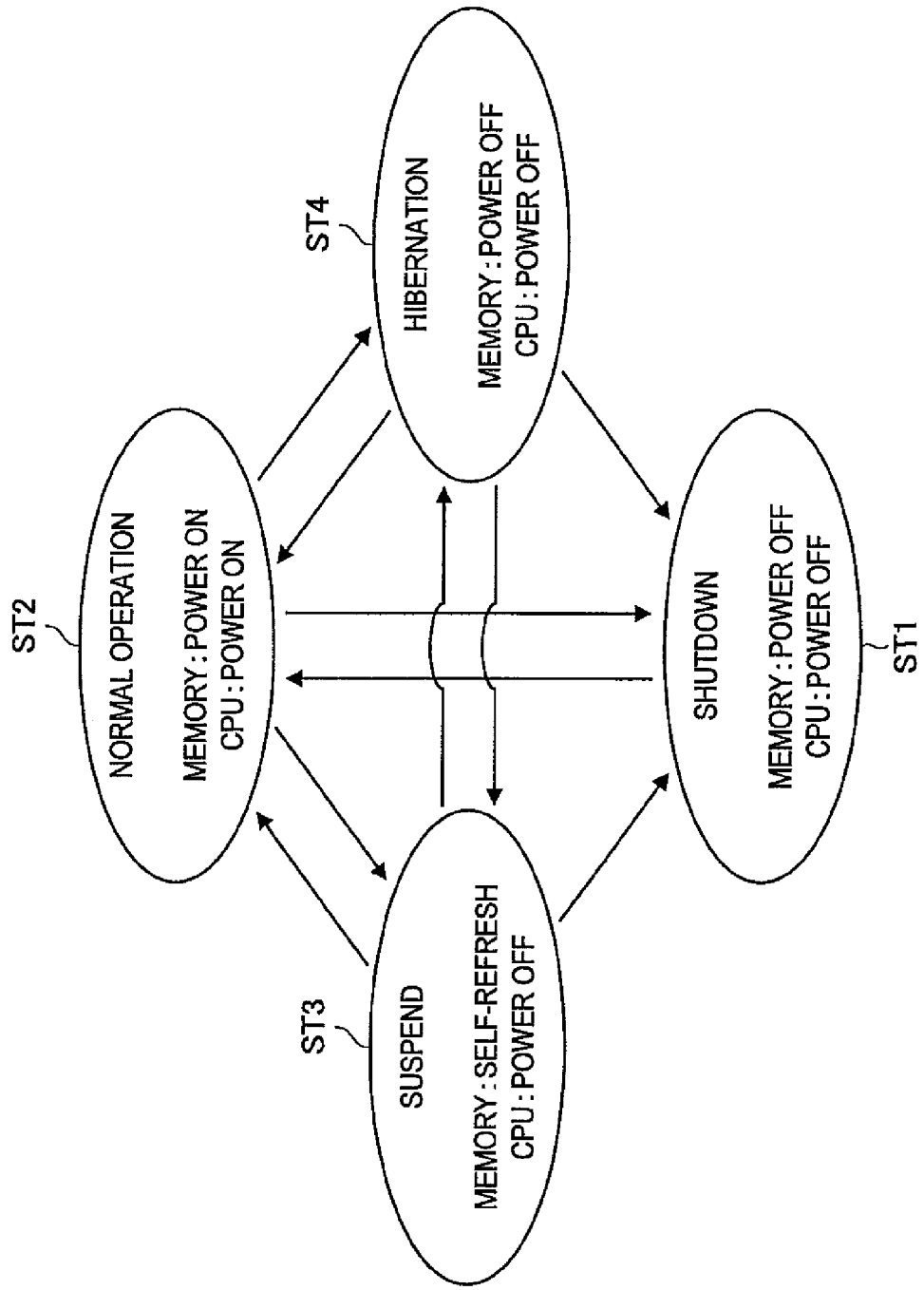
FIG. 3 is an explanatory diagram showing each operating state of the information processing device.

FIG. 3 is an explanatory diagram showing each operating state of the information processing device 1. As shown in FIG. 3, the operating state of the information processing device 1 includes a shutdown state ST1, a normal operation state ST2, a suspend state ST3 and a hibernation state ST4 by way of illustration.

In the shutdown state ST1, the power controller 32 does not supply power to the memory 26, the CPU 20 and so on (power off) as shown in FIG. 3. When the information processing device 1 makes a transition to the shutdown state ST1 from the shutdown state ST1 by pressing of the power switch 14, for example, the power controller 32 starts power supply to the memory 26, the CPU 20 and so on (power on).

After that, when the information processing device makes a transition to the suspend state ST3, the power controller 32 stops power supply to the CPU 20. On the other hand, the power controller 32 maintains power supply to the memory 26 so that the memory 26 can perform self-refresh according to control from the memory controller 24. The power controller 32 can control power supply to the memory 26 with respect to each memory area. For example, the power controller 32 can supply power to some memory areas of the memory 26 and stops power supply to other memory areas according to an instruction from the CPU 20 (BIOS). Note that the memory 26 can perform self-refresh in the memory area to which power is supplied according to control from the memory controller 24.

The suspend state ST3 is advantageous in that power consumption is lower than the normal operation state ST2 and that the time to return to the normal operation state ST2 is shorter than the hibernation state ST4.

Further, when the information processing device 1 makes a transition to the hibernation state ST4, the power controller 32 stops power supply to the CPU 20 and the memory 26. The data held in the memory 26 is saved into the HDD 28 by the CPU 20. Therefore, the hibernation state ST4 is advantageous in that power consumption is still lower than the suspend state ST3 because power supply to the memory 26 is stopped, although the time to return to the normal operation state ST2 is longer than the suspend state ST3.

(Circumstances of Development of Disclosure)

In general, determination about a transition from the normal state ST2 to a power saving state such as the suspend state ST3 or the hibernation state ST4 is made by an OS, and power control of the CPU 20, the memory 26 or the like is performed by a BIOS based on the determination made by the OS.

However, although a general BIOS can control the configuration of the memory 26, the memory controller 24, a peripheral circuit or the like, it does not grasp the location of programs, data or the like that is managed on the memory by the OS.

Therefore, although a general BIOS has a function to perform power control with respect to each memory area, it makes control so that the entire memory 26 performs self-refresh at the transition to the suspend state ST3, there arises a case where power is unnecessarily consumed in the memory 26.

Further, when the BIOS controls the transition to the hibernation state, it generally performs control so that the whole data in the memory 26 is saved into the HDD 28 at the transition to the hibernation state ST4, and there occurs a problem that it takes a long time to transition to the hibernation state ST4 and return from the hibernation state ST4.

Given such circumstances, embodiments of the disclosure have been invented. According to first and second embodiments of the disclosure, power consumption can be further reduced by making some memory area perform self-refresh and stopping power supply to other memory areas in the suspend state. Further, according to third and fourth embodiments of the disclosure, the time taken to transition to the hibernation state and return from the hibernation state can be shortened by selectively saving data stored in the memory 26 into the HDD 28 in the hibernation state. Each embodiment is described hereinafter in detail.

<2. First Embodiment>

[2-1. Functions of OS and BIOS According to First Embodiment]

Figure 4:
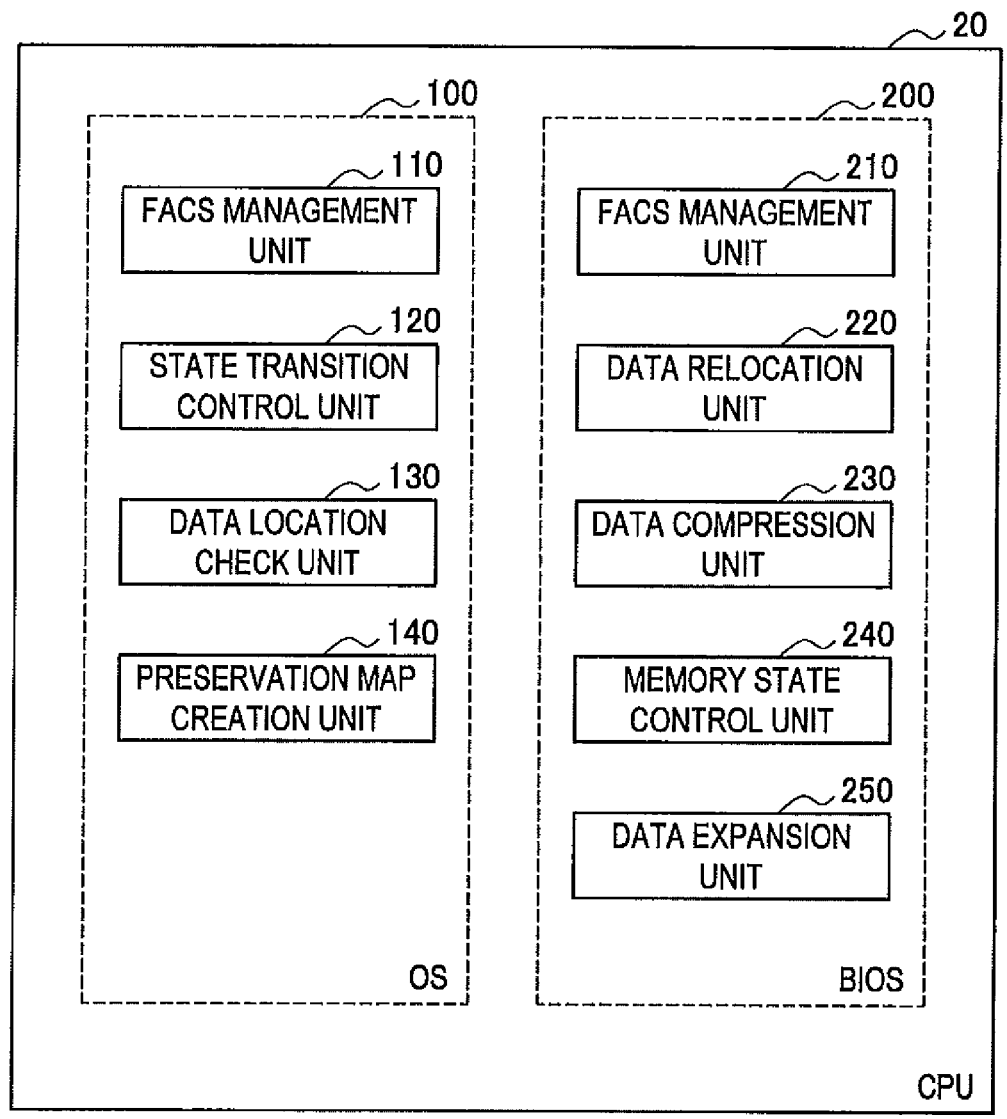
FIG. 4 is an explanatory diagram showing functions incorporated into OS and BIOS according to a first embodiment.

FIG. 4 is an explanatory diagram showing functions incorporated into an OS 100 and a BIOS 200 according to the first embodiment. Referring to FIG. 4, the OS 100 includes a FACS (Firmware ACPI Control Structure) management unit 110, a state transition control unit 120, a data location check unit 130, and a preservation map creation unit 140.

The FACS management unit 110 (flag setting unit) manages FACS to be used for an interaction with the BIOS 200. The FACS in this embodiment is an extension of FACS that is defined by ACPI (Advanced Configuration and Power management Interface), which is an open standard for coulomb control and components of a personal computer. A configuration example of FACS according to the embodiment is described hereinafter with reference to FIG. 5.

FIG. 5 is an explanatory diagram showing a configuration example of FACS according to the embodiment. As shown in FIG. 5, FACS contains fields such as Signature, Length, Hardware Signature, Firmware Waking Vector, Global Lock, Flags, X Firmware Waking Vector, Version, Reserved, OSPM Flags, and Preservation Map Address.

The contents of Flags and OSPM Flags, and Preservation Map Address in the above-described configuration example are novel elements. Specifically, Flags contains a flag "PRESERVATION_MAP_SUPPORTED_F" as shown in FIG. 5. PRESERVATION_MAP_SUPPORTED_F is a flag that indicates whether the BIOS 200 has a function to perform power control based on a preservation map, which is described later. PRESERVATION_MAP_SUPPORTED_F is set by the BIOS 200 at startup of the information processing device 1.

Further, OSPM Flags contains a flag "PRESERVATION_MAP_F" as shown in FIG. 5. PRESERVATION_MAP_F is a flag that indicates whether the OS 100 has created a preservation map and stored an address of the preservation map into the preservation map address. The FACS management unit 110 sets PRESERVATION_MAP_F, triggered by creation of a preservation map or the like, at the transition from the normal state to the power saving state such as the suspend state or the hibernation state.

Note that a reserved area of Flags and OSPM Flags is defined as "0" in ACPI. Therefore, when the OS does not have a function to create a preservation map or when the BIOS 200 does not have a function to perform power control based on a preservation map, it is assured that the function is not incorporated or null in Flags or OSPM Flags. For example, when the BIOS does not have the function to perform power control and the OS has the function to create a preservation map, PRESERVATION_MAP_SUPPORTED_F is "0", and the OS can determine that the BIOS does not have the function. On the other hand, when the BIOS has the function to perform power control and the OS does not have the function to create a preservation map, PRESERVATION_MAP_F is "0", and the BIOS does not refer to the preservation map. In this manner, with use of FACS according to the embodiment, normal operation of the information processing device 1 is ensured even when either one of BIOS or OS does not have the above-described function. Further, no additional implementation is necessary to indicate that the OS does not have the function to create a preservation map or that the BIOS does not have the function to perform power control.

Further, the preservation map address is described hereinafter with reference to FIG. 6.

Figure 6:
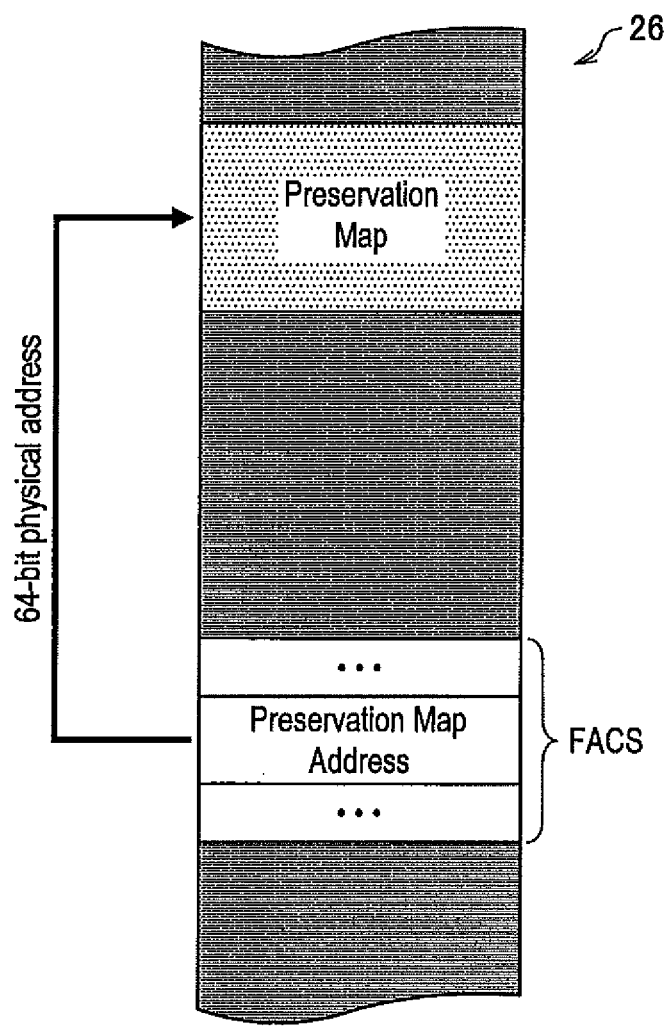
FIG. 6 is an explanatory diagram showing contents of preservation map address.

FIG. 6 is an explanatory diagram showing contents of the preservation map address. As shown in FIG. 6, the preservation map address included in FACS contains description of address information indicating the location of the preservation map that is created by the preservation map creation unit 140 in the memory 26. It is thereby possible to refer to the preservation map based on the preservation map address.

Referring back to FIG. 4, the configuration of the OS 100 is further described. The state transition control unit 120 performs determination about a state transition of the information processing device 1, preparatory processing for a state transition and so on. For example, the state transition control unit 120 may determine whether to make an operating state transition based on whether or not the transition switch 16 is pressed by a user or based on the use condition of the information processing device 1 by a user. Specifically, the state transition control unit 120 may determine a transition from the normal operation state to the suspend state or the hibernation state when the information processing device 1 is not used by a user for a specified length of time.

Further, preparatory processing at a suspend transition (a transition to the suspend state) by the state transition control unit 120 includes notification of a suspend transition to a driver/application, device register retention, device power control, Wake setting, interrupt inhibition, bus master transfer inhibition or the like.

The data location check unit 130 checks the location of data stored in the memory 26 when a transition from the normal operation state to the suspend state is decided by the state transition control unit 120. Further, the data location check unit 130 checks whether each data is data to be held (hold data) that should be held in the memory 26 during the suspend state.

Because the above-described checking is performed for creation of a preservation map, when the BIOS 200 does not have the function to perform power control based on a preservation map, the checking is unnecessary processing. Therefore, the data location check unit 130 may perform the checking when PRESERVATION_MAP_SUPPORTED_F is set by the BIOS.

The preservation map creation unit 140 creates a preservation map (location information) based on a result of checking by the data location check unit 130. The preservation map is information indicating the located position and the attribute (whether it is data to be held or not) of each data stored in the memory 26. A specific example of the preservation map is described hereinbelow.

Figure 7:
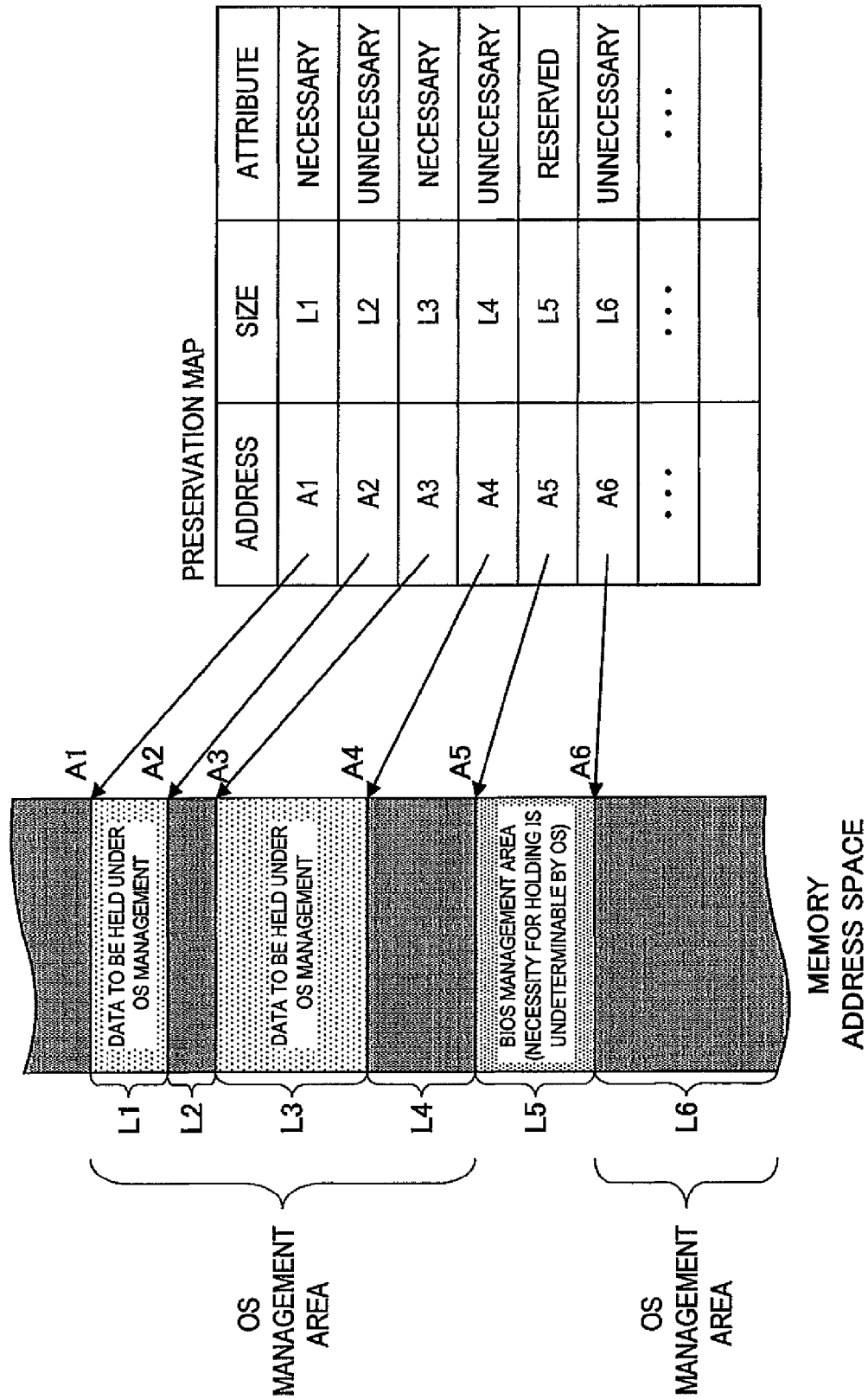
FIG. 7 is an explanatory diagram showing a specific example of a preservation map created by a preservation map creation unit.

FIG. 7 is an explanatory diagram showing a specific example of a preservation map created by the preservation map creation unit 140. As shown in FIG. 7, each entry of the preservation map contains information related to address, size, and attribute. For example, because data with the size L1 that begins at the address A1 is data to be held under OS management, the preservation map creation unit 140 describes "necessary" as the attribute of the data.

The data to be held under OS management contains a program of the OS 100, an application program, application data and so on, for example. On the other hand, data in need of disk cache is not necessarily contained in the data to be held.

Further, because data with the size L5 that begins at the address A5 is in a management area by the BIOS 200 and the necessity for holding is undeterminable on the OS 100 side, the preservation map creation unit 140 describes "resered" as the attribute of the data.

Figure 8:
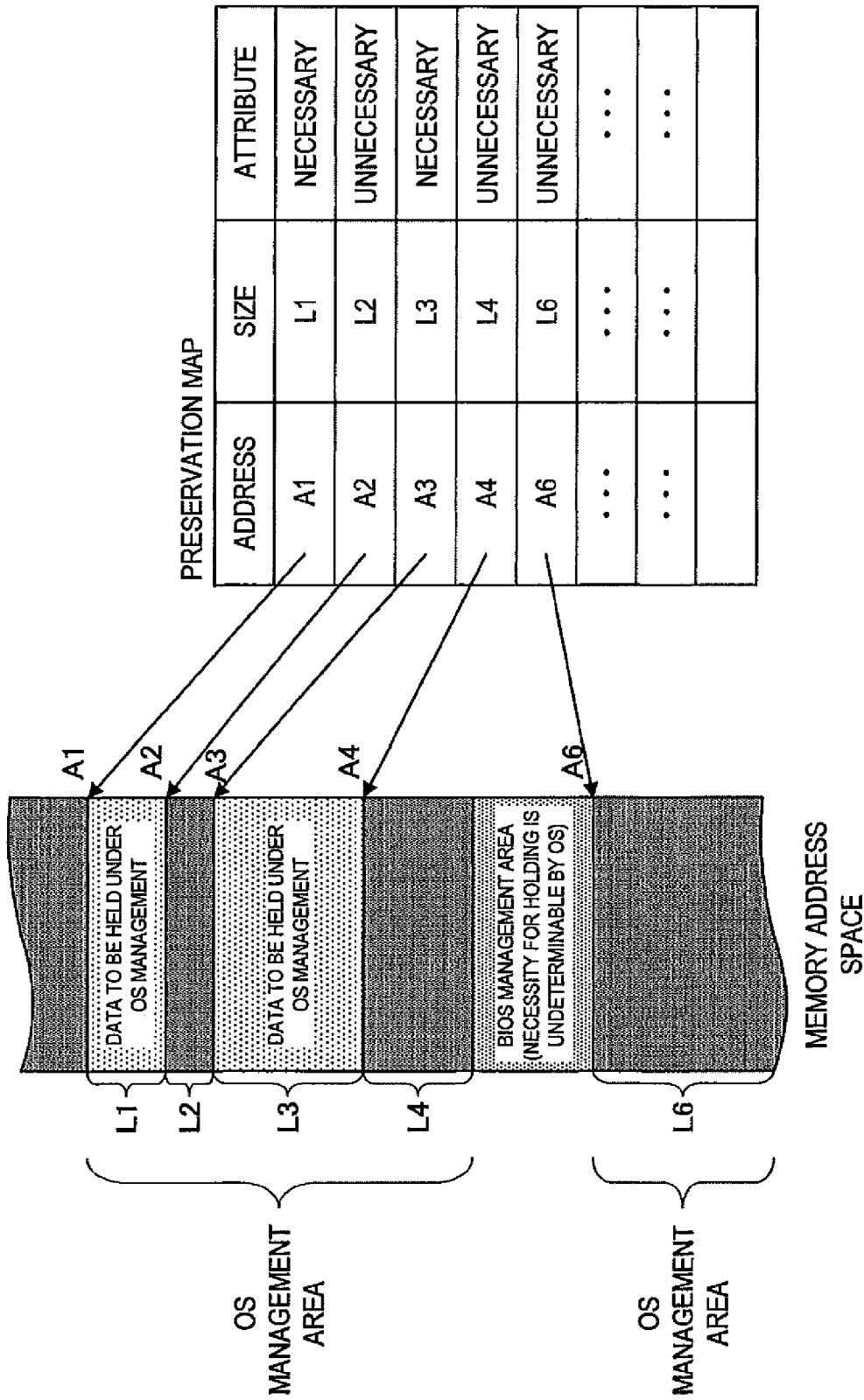
FIG. 8 is an explanatory diagram showing an alternative example of a preservation map created by a preservation map creation unit.

Note that, although the case where the preservation map contains the location information of the whole data on the memory 26 is described in FIG. 7, the preservation map is not limited to such an example. For example, as shown in FIG. 8, the preservation map may contain information of the OS management area and not contain information of the BIOS management area.

At the time of suspend transition, when preparatory processing on the OS 100 side, such as creation of the preservation map by the preservation map creation unit 140, is completed, the OS 100 notifies the BIOS 200 of the suspend transition.

Referring back to FIG. 4, functions of the BIOS 200 are described. The BIOS 200 includes a FACS management unit 210, a data relocation unit 220, a data compression unit 230, a memory state control unit 240, and a data expansion unit 250 as shown in FIG. 4.

The FACS management unit 210 (flag setting unit) manages FACS to be used for an interaction with the OS 100. For example, because the BIOS 200 is compatible with power control based on a preservation map, the FACS management unit 210 sets a flag to PRESERVATION_MAP_SUPPORTED_F in FACS at startup of the information processing device 1.

The data relocation unit 220 (location change unit) changes the data location in the memory 26 at the transition from the normal operation state to the suspend state or at the return from the suspend state to the normal operation state.

Specifically, at the transition from the normal operation state to the suspend state, the data relocation unit 220 checks PRESERVATION_MAP_F of FACS. Then, when a flag is set to PRESERVATION_MAP_F, that is, when a preservation map is created by the OS 100 and an address of the preservation map is stored into the preservation map address, the data relocation unit 220 checks the preservation map address.

Next, the data relocation unit 220 refers to the preservation map based on the preservation map address and changes the location of data to be held so as to reduce the number of memory areas storing the data to be held (defragmentation of data to be held).

Further, at the return from the suspend state to the normal operation state, the data relocation unit 220 changes the location of data to be held in the memory 26 back to the same location as before the transition to the suspend state. For this purpose, the data relocation unit 220 may hold the details of the location change that is made at the transition from the normal operation state to the suspend state.

The data compression unit 230 compresses the data to be held at the transition from the normal operation state to the suspend state. Note that, although the case where the compression of the data to be held is performed after the location change by the data relocation unit 220 is described in this specification, the compression of the data to be held may be performed before the location change by the data relocation unit 220.

The memory state control unit 240 performs power control of the memory 26 with respect to each memory area by giving an instruction to the memory controller 24 or the power controller 32 after processing by the data relocation unit 220 and the data compression unit 230.

Specifically, the memory state control unit 240 makes control to perform self-refresh for memory areas in which the data to be held exists and not to perform self-refresh for other memory areas among a plurality of memory areas that constitute the memory 26. Specifically, the memory state control unit 240 gives an instruction to the memory controller 24 or the power controller 32 so as to stop power supply to the memory areas in which the data to be held does not exist.

The data expansion unit 250 expands the data compressed by the data compression unit 230 at the return from the suspend state to the normal operation state.

By the above-described configuration, it is possible to make only the memory area storing the data to be held in the memory 26, not the memory 26 as a whole, perform self-refresh in the suspend state, thereby reducing power consumption. Hereinafter, processing by the data relocation unit 220, the data compression unit 230 and the memory state control unit 240 is described in further detail with reference to FIG. 9.

Figure 9:
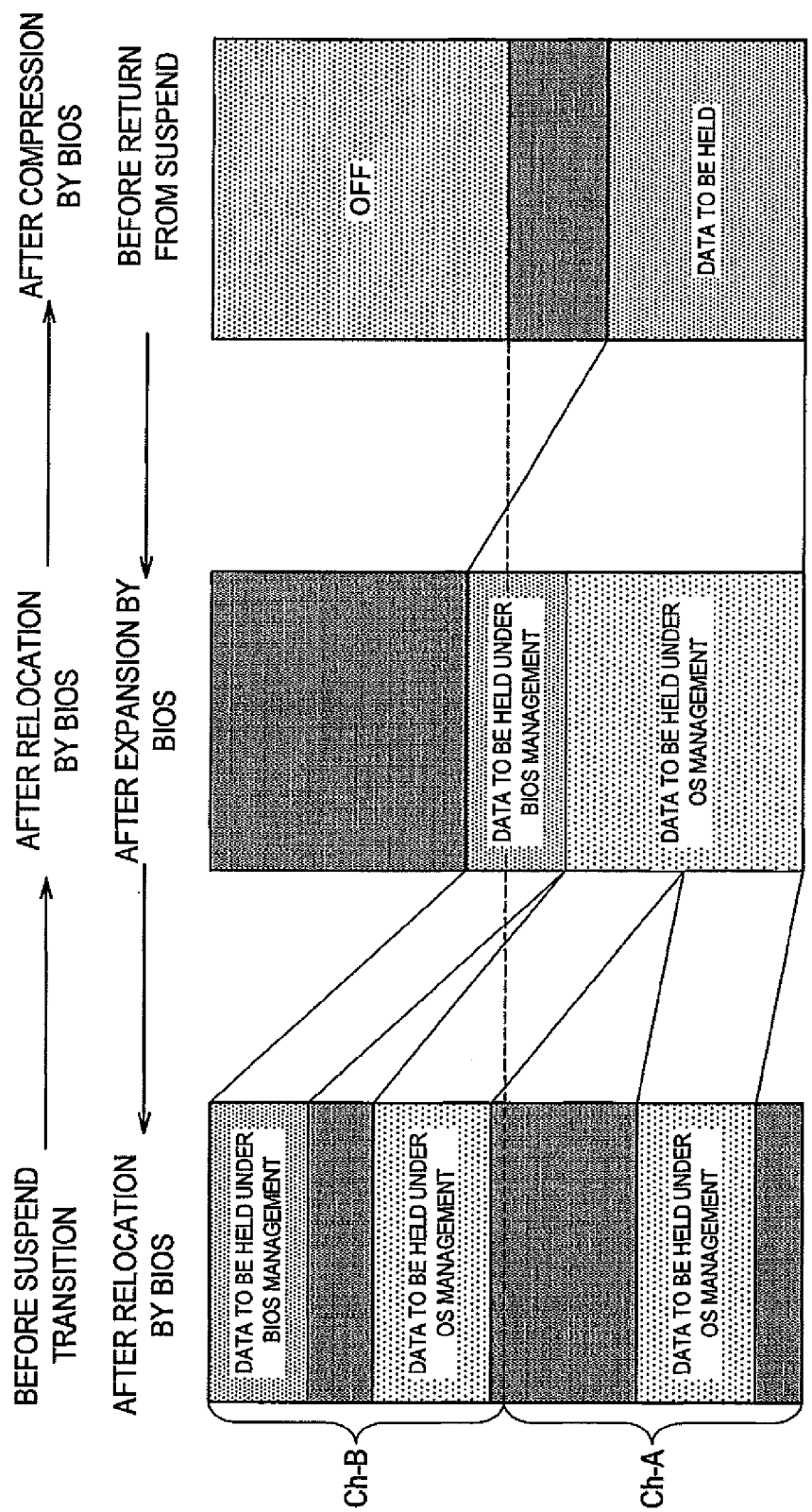
FIG. 9 is an explanatory diagram showing a specific example of processing performed at transition to suspend state.

FIG. 9 is an explanatory diagram showing a specific example of processing performed at the transition to the suspend state. When the data to be held is located scattered across the channels A and B on the memory 26 as shown at the left of FIG. 9, the data relocation unit 220 changes the location of each data to be held so that the data to be held concentrates on one part of the memory 26 as shown at the middle of FIG. 9.

Further, the data compression unit 230 compresses the data to be held as shown at the right of FIG. 9. As a result, when the data to be held exists only in the channel A as shown at the right of FIG. 9, the memory state control unit 240 makes control to perform self-refresh for the channel A. On the other hand, the memory state control unit 240 causes the power controller 32 to stop power supply for the channel B and thereby turns off the channel B. This configuration enables significant reduction of power consumption in the memory 26 in the suspend state.

Further, at the return from the suspend state to the normal operation state, the data expansion unit 250 expands the compressed data to be held that is stored in the memory 26. Further, the data relocation unit 220 changes the location of the data to be held in the memory 26 back the same location as before the transition to the suspend state. In this configuration, the location of the data to be held in the memory 26 can be back to the data location as grasped by the OS 100, and the information processing device 1 can thereby normally return to the normal operation state.

[2-2. Operations of OS and BIOS According to First Embodiment]

The functions of the OS and the BIOS according to the first embodiment are described above. Hereinafter, the operations of the OS and the BIOS according to the first embodiment are described with reference to FIGS. 10 to 14.

(Operation of BIOS 200 at Startup)

Figure 10:
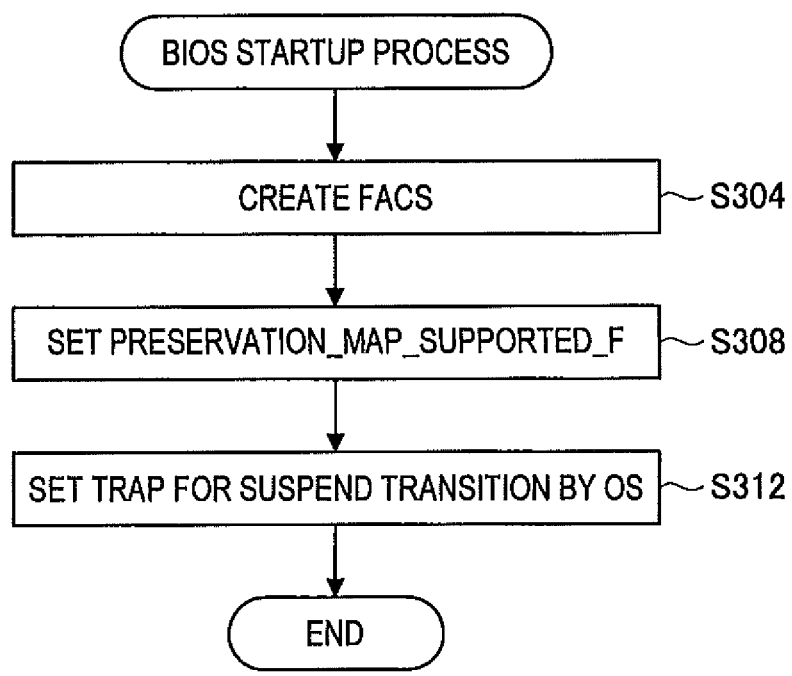
FIG. 10 is a flowchart showing an operation of BIOS at startup of an information processing device 1.

FIG. 10 is a flowchart showing the operation of the BIOS 200 at startup of the information processing device 1. Referring to FIG. 10, the FACS management unit 210 of the BIOS 200 first creates FACS (S304).

Further, the FACS management unit 210 sets a flag to PRESERVATION_MAP_SUPPORTED_F in FACS (S308). After that, the BIOS 200 sets a trap for the transition to the suspend state (S312). Note that such an operation of the BIOS 200 at the time of startup is applied also to the second to fourth embodiments.

(Operation of OS 100 at Suspend Transition)

Figure 11:
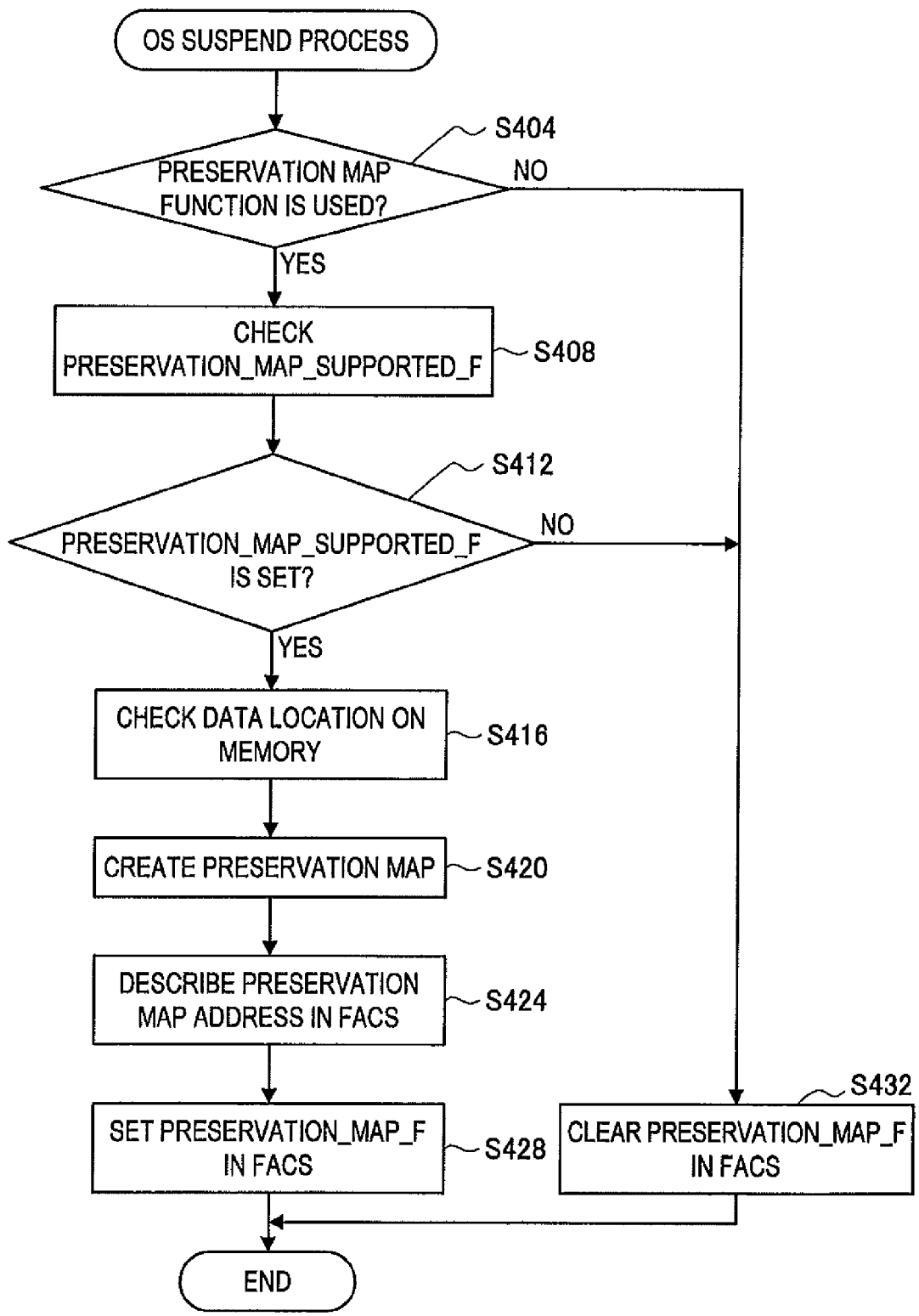
FIG. 11 is a flowchart showing an operation by OS at transition to suspend state.

FIG. 11 is a flowchart showing the operation by the OS 100 at the transition to the suspend state. Referring to FIG. 11, when the OS 100 uses the preservation map function (S404), the data location check unit 130 checks PRESERVATION_MAP_SUPPORTED_F in FACS (S408).

Then, when a flag is set to PRESERVATION_MAP_SUPPORTED_F in FACS (S412), the data location check unit 130 checks data location on the memory 26 (S416).

After that, the preservation map creation unit 140 creates the preservation map, which is described earlier with reference to FIG. 8, based on a result of the checking by the data location check unit 130 (S420).

Further, the FACS management unit 110 describes address information of the preservation map into the preservation map address in FACS (S424). Furthermore, the FACS management unit 110 sets a flag to PRESERVATION_MAP_F in FACS (S428). After that, the transition to the suspend state is notified from the OS 100 to the BIOS 200.

On the other hand, the case where the OS 100 does not use the preservation map function (S404) or where a flag is not set to PRESERVATION_MAP_SUPPORTED_F (S412) is also assumed. In such a case, the FACS management unit 110 clears PRESERVATION_MAP_F in FACS (S432).

(Operation of BIOS 200 at Suspend Transition)

Figure 12:
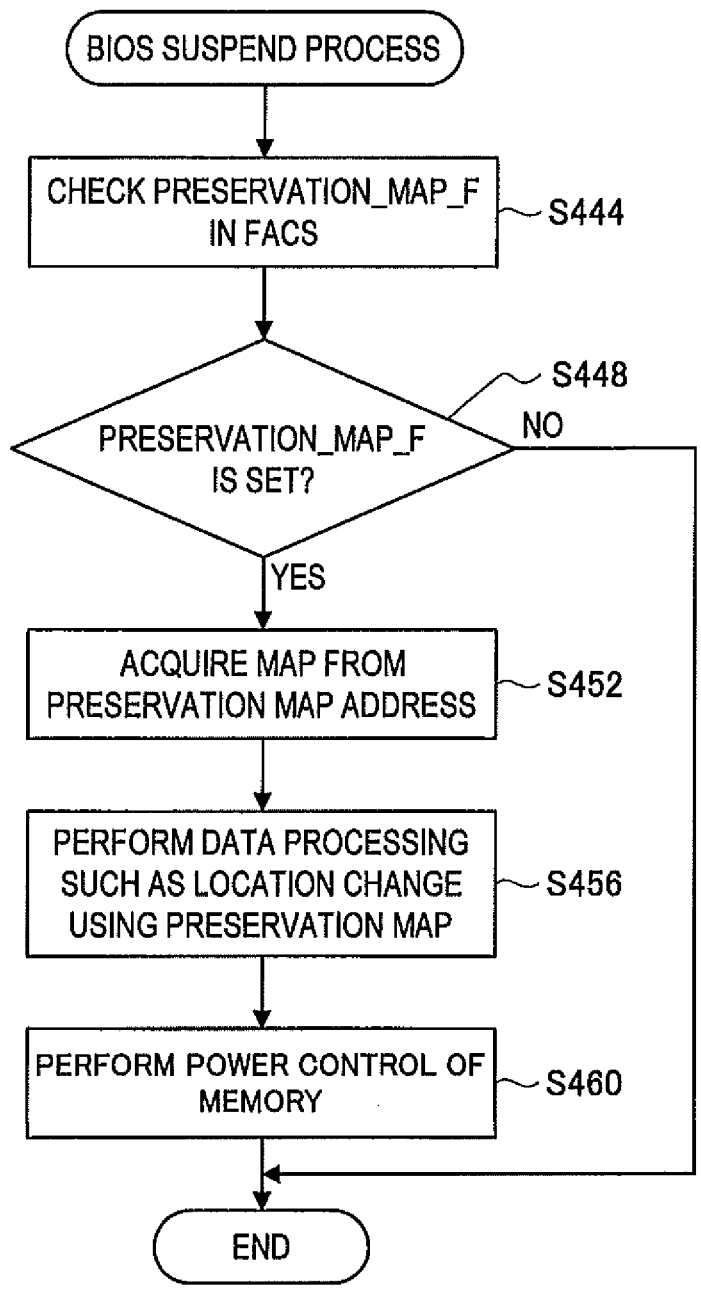
FIG. 12 is a flowchart showing an operation by BIOS at transition to suspend state.

FIG. 12 is a flowchart showing the operation by the BIOS 200 at the transition to the suspend state. Referring to FIG. 12, the data relocation unit 220 of the BIOS 200 first checks PRESERVATION_MAP_F in FACS (S444).

Then, when a flag is set to PRESERVATION_MAP_F (S448), the data relocation unit 220 acquires a preservation map based on the preservation map address in FACS (S452).

After that, the data relocation unit 220 changes the location of the data to be held, and the data compression unit 230 compresses the data to be held (S456).

Then, the memory state control unit 240 makes control to perform self-refresh for memory areas in which the data to be held exists and not to perform self-refresh for other memory areas among a plurality of memory areas that constitute the memory 26 (S460). Specifically, the memory state control unit 240 gives an instruction to the power controller 32 so as to stop power supply to the memory areas in which the data to be held does not exist.

In such a configuration, it is possible to make only the memory area storing the data to be held in the memory 26, not the memory 26 as a whole, perform self-refresh in the suspend state, thereby reducing power consumption.

(Operation of BIOS 200 at Return to Normal Operation State)

Figure 13:
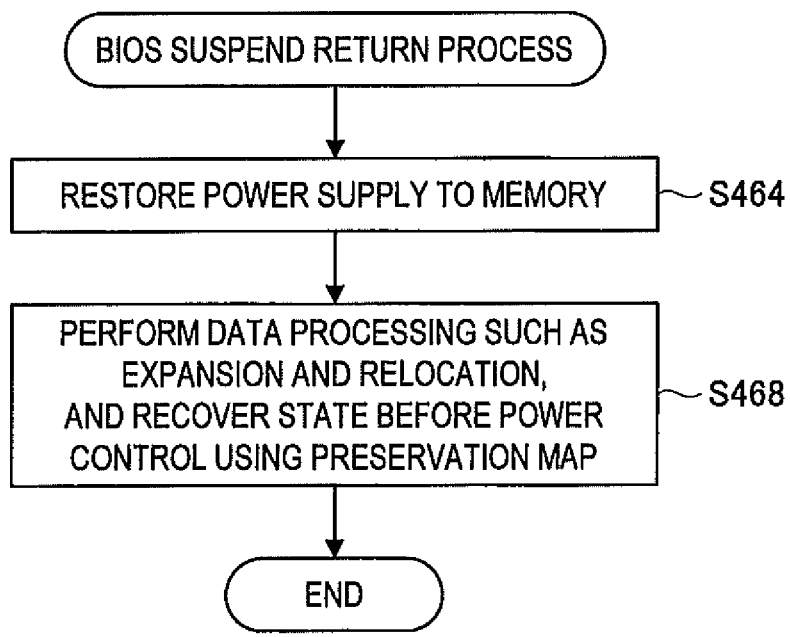
FIG. 13 is a flowchart showing an operation by BIOS at return from suspend state to normal operation state.

FIG. 13 is a flowchart showing the operation by the BIOS 200 at the return from the suspend state to the normal operation state. Referring to FIG. 13. the memory state control unit 240 of the BIOS 200 gives an instruction to the power controller 32 so as to restart power supply to the entire memory 26 and thereby restore power supply to the memory (S464).

After that, the data expansion unit 250 expands the compressed data to be held in the memory 26, and the data relocation unit 220 changes the location of the data to be held in the memory 26 back to the same location as before the transition to the suspend state (S468). In this configuration, the location of the data to be held in the memory 26 can be back to the data location as grasped by the OS 100, and the information processing device 1 can thereby normally return to the normal operation state.

(Series of Operations by OS 100 and BIOS 200)

Figure 14:
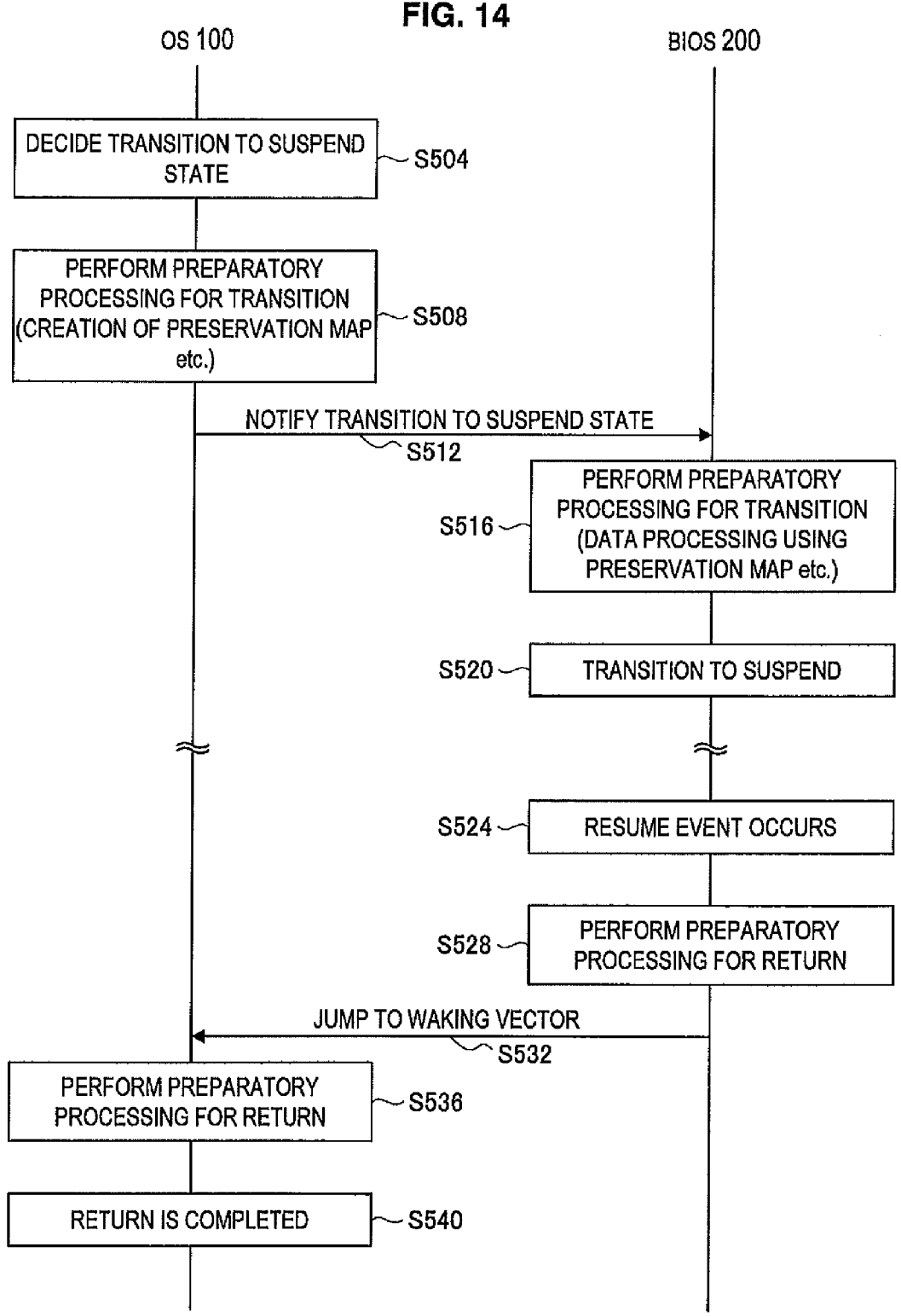
FIG. 14 is a sequence chart showing a series of operations by OS and BIOS.

FIG. 14 is a sequence chart showing a series of operations by the OS 100 and the BIOS 200. First, when the state transition control unit 120 of the OS 100 decides a transition from the normal operation state to the suspend state (S504), the OS 100 performs preparatory processing for the transition to the suspend state (S508). Then, when the preparatory processing ends, the OS 100 notifies the BIOS 200 of the transition to the suspend state (S512).

The preparatory processing by the OS 100 includes creation of a preservation map by the preservation map creation unit 140. Further, the preparatory processing by the OS 100 may include notification of a suspend transition to a driver/application, device register retention, device power control, Wake setting, interrupt inhibition, bus master transfer inhibition or the like.

After that, the BIOS 200 performs preparatory processing for the transition to the suspend state (S516). Then, when the preparatory processing ends, the memory state control unit 240 performs power control of the memory 26 with respect to each memory area and makes the information processing device 1 transition to the suspend state (S520).

The preparatory processing by the BIOS 200 includes location change of data to be held by the data relocation unit 220 using a preservation map. Further, the preparatory processing by the BIOS 200 may include device register retention, device power control, Wake setting, interrupt inhibition, bus master transfer inhibition or the like.

After that, when a resume event occurs (S524), the BIOS 200 performs preparatory processing for the return to the normal operation state (S528). The preparatory processing by the BIOS 200 includes relocation of data to be held by the data relocation unit 220. Further, the preparatory processing by the BIOS 200 may include device power control, device initialization, device register restoration, checking of Wake factor or the like.

Then, when the preparatory processing by the BIOS 200 ends, jump to Waking Vector is performed (S532), and the OS 100 performs preparatory processing for the return to the normal operation state (S536), and the return to the normal operation state is thereby completed (S540).

The preparatory processing by the OS 100 may include device initialization, device register restoration, checking of Wake factor, notification of a return to a driver/application or the like.

As described above, the first embodiment of the disclosure allows only the memory area storing the data to be held in the memory 26, not the memory 26 as a whole, to perform self-refresh in the suspend state, and it is thereby possible to reduce power consumption. ps <3. Second Embodiment>

A second embodiment of the disclosure is described next. The second embodiment of the disclosure is different from the first embodiment in the function sharing of the OS 100 and the BIOS 200 as described below; however, it is possible to reduce power consumption in the suspend state like the first embodiment.

[3-1. Functions of OS and BIOS According to Second Embodiment]

Figure 15:
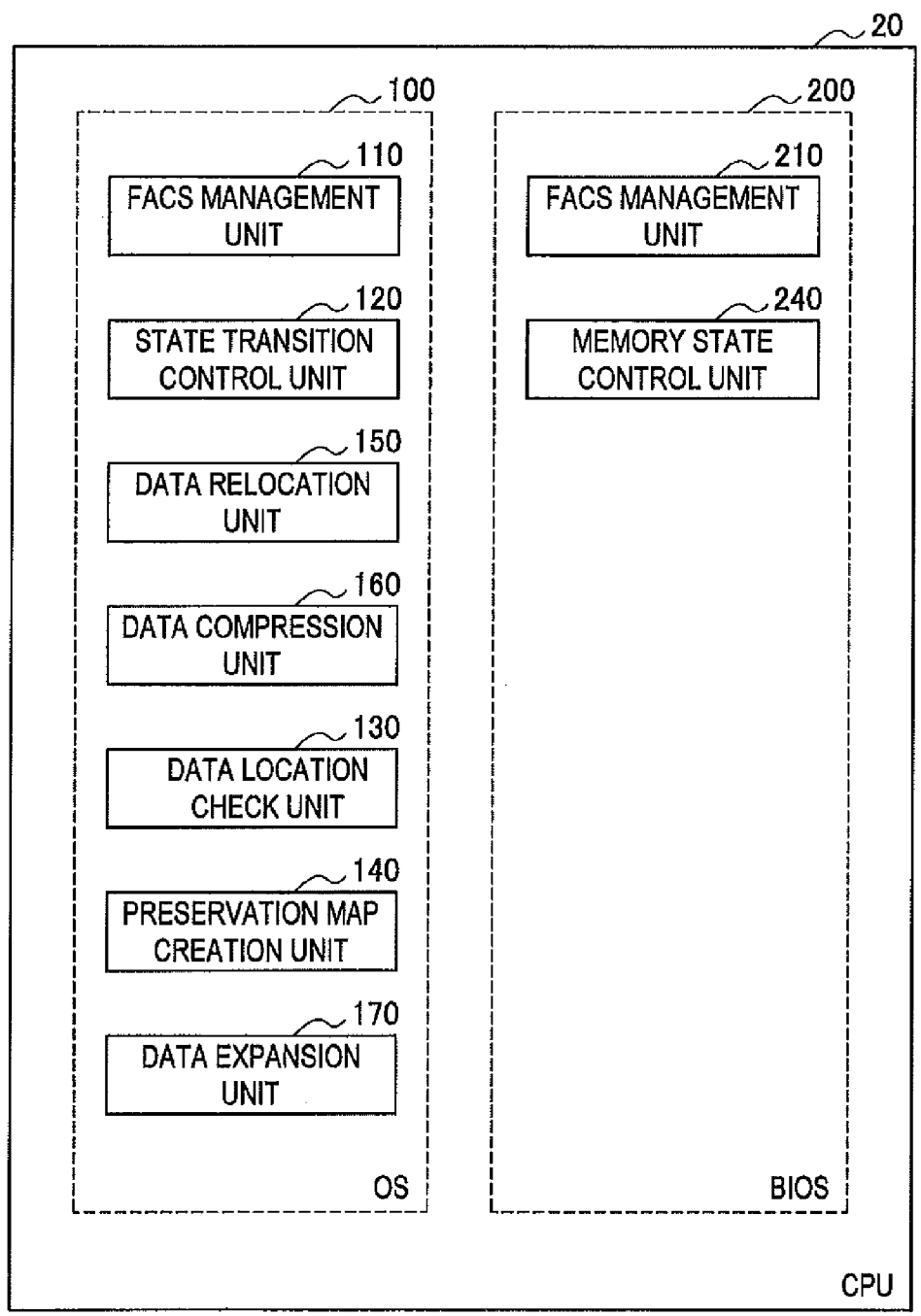
FIG. 15 is an explanatory diagram showing functions incorporated into OS and BIOS according to a second embodiment.

FIG. 15 is an explanatory diagram showing functions incorporated an OS 100 and a BIOS 200 according to the second embodiment. Referring to FIG. 15, the OS 100 includes a FACS management unit 110, a state transition control unit 120, a data location check unit 130, a preservation map creation unit 140, a data relocation unit 150, a data compression unit 160, and a data expansion unit 170. Because the FACS management unit 110, the state transition control unit 120 and the preservation map creation unit 140 are described in the first embodiment, the elements different from the first embodiment are mainly described below.

The data relocation unit 150 performs defragmentation of data stored in the memory 26 when a transition from the normal operation state to the suspend state is decided by the state transition control unit 120. Note that, when it is possible to grasp whether each data stored in the memory 26 is data to be held or not, the data relocation unit 150 may change the location of the data to be held so as to reduce the number of memory areas storing the data to be held (defragmentation of data to be held).

The data compression unit 160 compresses data stored in the memory 26 when a transition from the normal operation state to the suspend state is decided by the state transition control unit 120. Note that, when it is possible to grasp whether each data stored in the memory 26 is data to be held or not, the data compression unit 160 may compress the data to be held. Further, the order of performing processing by the data relocation unit 150 and processing by the data compression unit 160 is not particularly limited. Furthermore, the data compressed by the data compression unit 160 is expanded by the data expansion unit 170 at the time of returning to the normal operation state.

The data location check unit 130 checks the location of the data stored in the memory 26 after processing by the data relocation unit 150 and the data compression unit 160. Further, the data location check unit 130 checks whether each data is data to be held that should be held in the memory 26 during the suspend state.

The preservation map creation unit 140 creates a preservation map based on a result of the checking by the data location check unit 130 in the same manner as in the first embodiment.

Further, as shown in FIG. 15, the BIOS 200 according to the second embodiment includes a FACS management unit 210 and a memory state control unit 240.

The FACS management unit 210 manages FACS to be used for an interaction with the OS 100 just like in the first embodiment. For example, because the BIOS 200 supports power control based on a preservation map, the FACS management unit 210 sets a flag to PRESERVATION_MAP_SUPPORTED_F in FACS at startup of the information processing device 1.

The memory state control unit 240 checks PRESERVATION_MAP_F of FACS at the transition from the normal operation state to the suspend state. Then, when a flag is set to PRESERVATION_MAP_F, that is, when a preservation map is created by the OS 100 and an address of the preservation map is stored into the preservation map address, the memory state control unit 240 checks the preservation map address.

Next, the memory state control unit 240 refers to the preservation map based on the preservation map address and differentiates between memory areas in which the data to be held exists, and memory areas in which the data to be held does not exist.

Then, the memory state control unit 240 makes control to perform self-refresh for memory areas in which the data to be held exists and not to perform self-refresh for other memory areas among a plurality of memory areas that constitute the memory 26. Specifically, the memory state control unit 240 gives an instruction to the power controller 32 so as to stop power supply to the memory areas in which the data to be held does not exist.

As described above in the second embodiment, change of data location and compression of data may be performed on the OS 100 side. In this case also, it is possible to make only the memory area storing the data to be held in the memory 26, not the memory 26 as a whole, perform self-refresh in the suspend state, thereby reducing power consumption just like in the first embodiment.

[3-2. Operations of OS and BIOS According to Second Embodiment]

Figure 16:
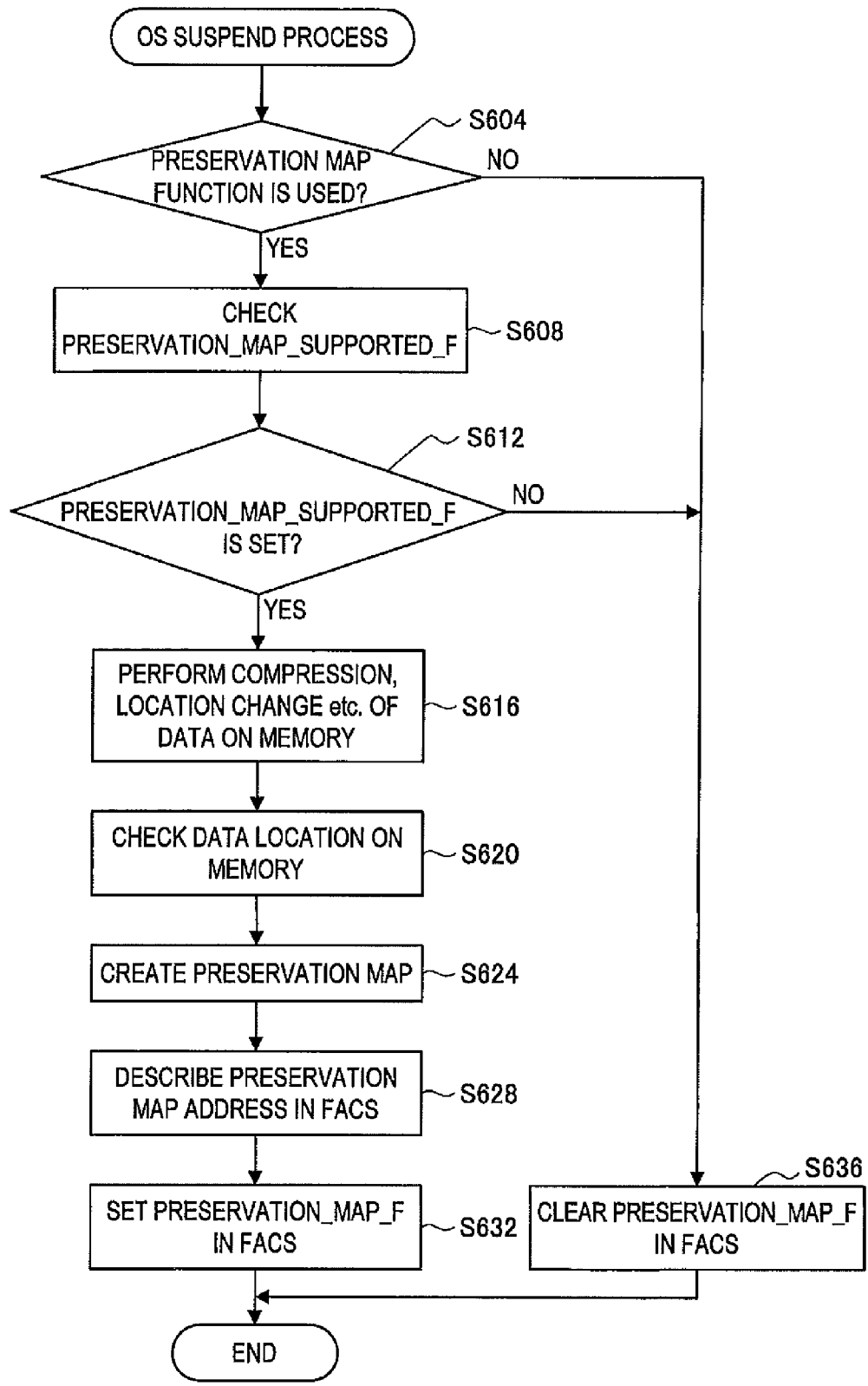
FIG. 16 is a flowchart showing an operation by OS at transition to suspend state.

FIG. 16 is a flowchart showing the operation by the OS 100 at the transition to the suspend state. Referring to FIG. 16, when the OS 100 uses the preservation map function (S604), the data relocation unit 150 or the data compression unit 160 checks PRESERVATION_MAP_SUPPORTED_F in FACS (S608).

Then, when a flag is set to PRESERVATION_MAP_SUPPORTED_F in FACS (S612), the data relocation unit 150 and the data compression unit 160 perform processing such as location change and compression of data stored in the memory 26 (S616).

After that, the data location check unit 130 checks the data location on the memory 26 (S620), and the preservation map creation unit 140 creates the preservation map, which is described earlier with reference to FIG. 8, based on a result of the checking by the data location check unit 130 (S624).

Further, the FACS management unit 110 describes address information of the preservation map into the preservation map address in FACS (S628). Furthermore, the FACS management unit 110 sets a flag to PRESERVATION_MAP_F in FACS (S632). After that, the transition to the suspend state is notified from the OS 100 to the BIOS 200.

On the other hand, the case where the OS 100 does not use the preservation map function (S604) or where a flag is not set to PRESERVATION_MAP_SUPPORTED_F (S612) is also assumed. In such a case, the FACS management unit 110 clears PRESERVATION_MAP_F in FACS (S636).

(Operation of BIOS 200 at Suspend Transition)

Figure 17:
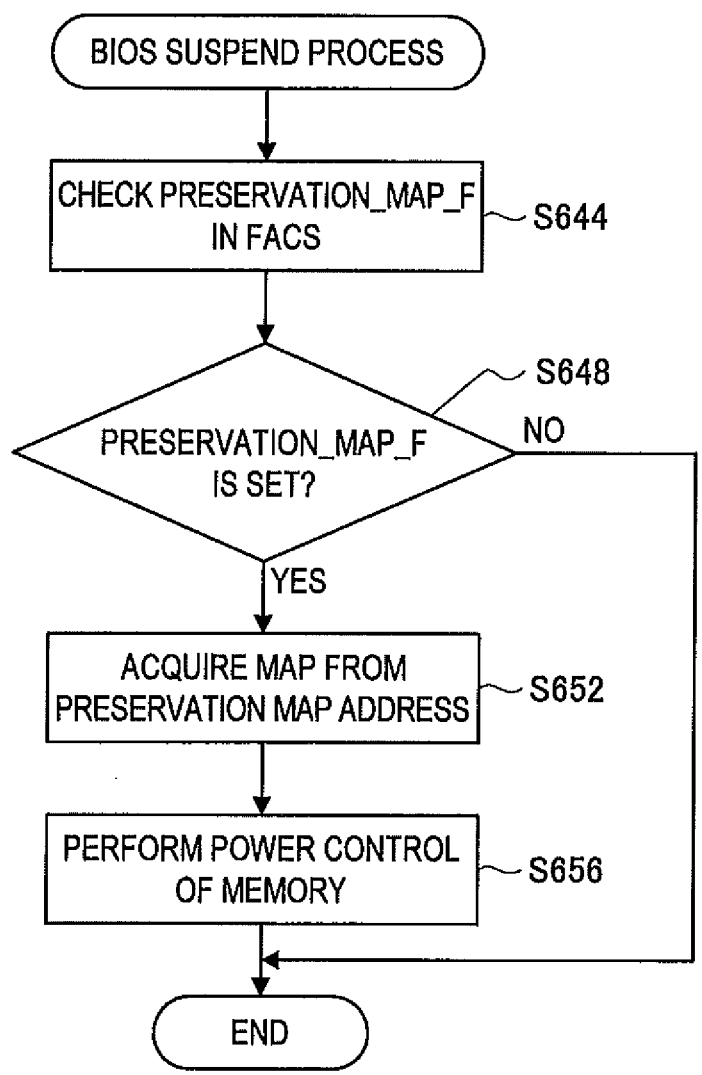
FIG. 17 is a flowchart showing an operation by BIOS at transition to suspend state.

FIG. 17 is a flowchart showing the operation by the BIOS 200 at the transition to the suspend state. Referring to FIG. 17, the memory state control unit 240 of the BIOS 200 first checks PRESERVATION_MAP_F in FACS (S644).

Then, when a flag is set to PRESERVATION_MAP_F (S648), the memory state control unit 240 acquires a preservation map based on the preservation map address in FACS (S652).

Then, the memory state control unit 240 makes control to perform self-refresh for memory areas in which the data to be held exists and not to perform self-refresh for other memory areas among a plurality of memory areas that constitute the memory 26 (S656). Specifically, the memory state control unit 240 gives an instruction to the memory controller 24 or the power controller 32 so as to stop power supply to the memory areas in which the data to be held does not exist.

This above-described configuration allows only the memory area storing the data to be held in the memory 26, not the memory 26 as a whole, to perform self-refresh in the suspend state, and it is thereby possible to reduce power consumption.

<4. Third Embodiment>

A third embodiment of the disclosure is described next. The third embodiment of the disclosure is different in the point related to processing at the transition to the hibernation state from the first embodiment and the second embodiment related to the transition to the suspend state.

[4-1. Functions of OS and BIOS According to Third Embodiment]

Figure 18:
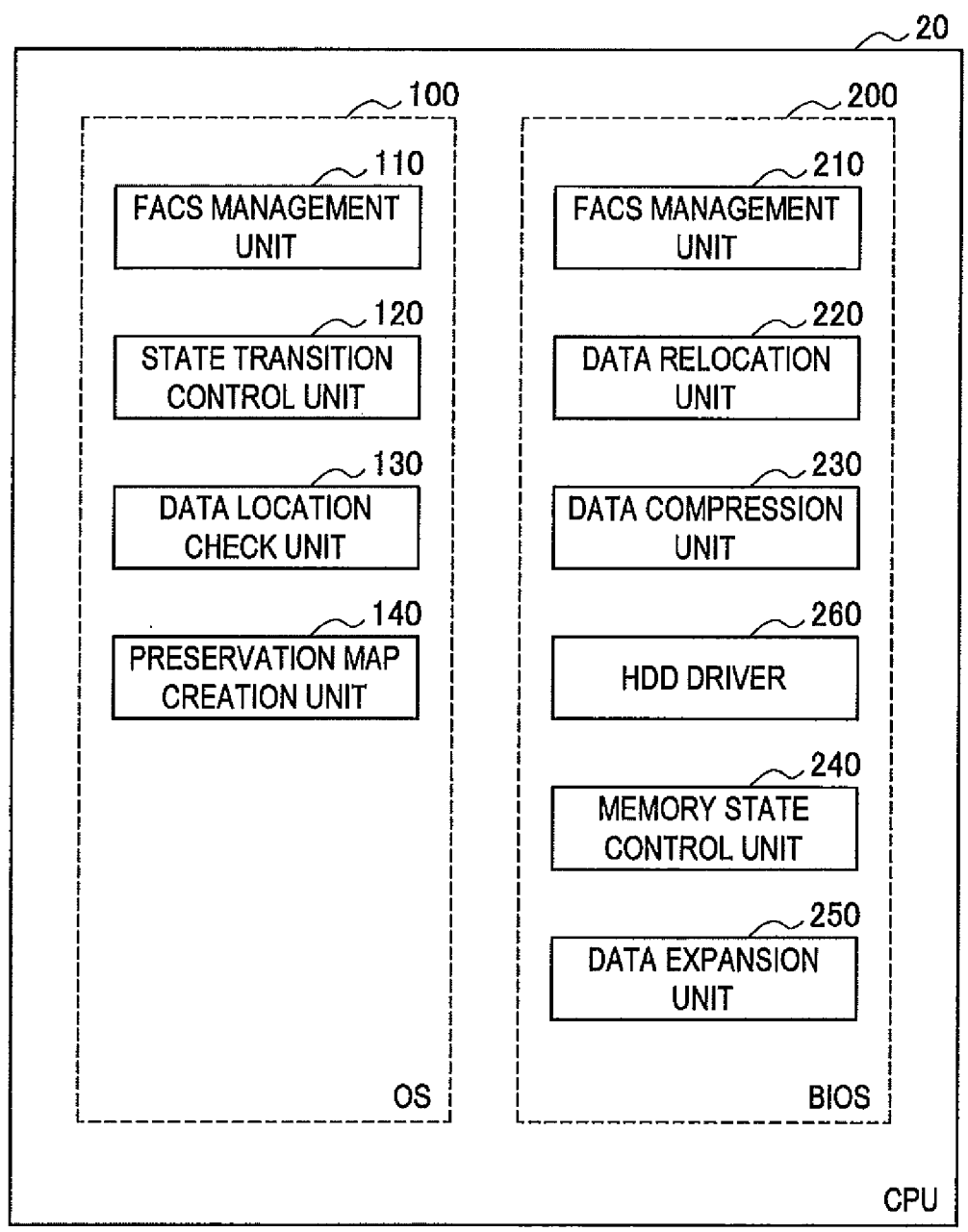
FIG. 18 is an explanatory diagram showing functions incorporated into OS and BIOS according to a third embodiment.

FIG. 18 is an explanatory diagram showing functions incorporated an OS 100 and a BIOS 200 according to the third embodiment. Referring to FIG. 18, the OS 100 includes a FACS management unit 110, a state transition control unit 120, a data location check unit 130, and a preservation map creation unit 140.

The OS 100 creates a preservation map in the same manner as in the first embodiment at the transition to the hibernation state as well. Specifically, when a transition to the hibernation state is decided by the state transition control unit 120, the data location check unit 130 checks the data location of the memory 26, and the preservation map creation unit 140 creates a preservation map. Note that there is a case where the BIOS 200 executes the transition to the hibernation state even when the state transition control unit 120 decides the transition to the suspend state. In this embodiment, even when the transition to the suspend state is decided by the state transition control unit 120, the preservation map creation unit 140 creates a preservation map, and the BIOS 200 can execute the transition to the hibernation state by referring to the preservation map.

Further, the BIOS 200 includes a FACS management unit 210, a data relocation unit 220, a data compression unit 230, a memory state control unit 240, a data expansion unit 250 and an HDD driver 260 as shown in FIG. 18.

The data relocation unit 220 and the data compression unit 230 perform location change and compression of the data to be held on the memory 26 by referring to the preservation map just like in the first embodiment. Further, the data relocation unit 220 and the data expansion unit 250 perform expansion and relocation of the data to be held at the time of returning to the normal operation state just like in the first embodiment.

The HDD driver 260 saves the data to be held on the memory 26 after processing by the data relocation unit 220 and the data compression unit 230 into the HDD 28. Further, at the time of returning to the normal operation state, the HDD driver 260 loads the data to be held that has been saved into the HDD 28 back to the memory 26. Because the amount of the data to be held that is saved into the HDD 28 is reduced by the compression by the data compression unit 230, the time for saving and the time for restoring the data to be held back in the memory 26 can be shortened.

Further, writing of data into the HDD 28 is performed in units of specified amount of data (e.g. 512 Kbytes). Therefore, when the data to be held is scattered and the amount of each data to be held does not reach the specified amount, an empty space is generated in the HDD 28. For example, when the data to be held is 100 Kbytes, an empty space of 412 Kbytes exists in the HDD 28.

Regarding this point, because the data relocation unit 220 performs defragmentation of data to be held in this embodiment, the data to be held is located concentrically on one part of the memory 26. As a result, it is possible to prevent the above issue and efficiently save the data to be held into the HDD 28.

After saving the data to be held into the HDD 28, the memory state control unit 240 performs power control of the memory 26 by giving an instruction to the power controller 32. Specifically, the memory state control unit 240 gives an instruction to the power controller 32 so as to stop power supply to the memory 26 as a whole. The information processing device 1 thereby makes transition to the hibernation state.

Note that when it is difficult to save the whole data to be held into the HDD 28 due to a reason such as being unable to allocate an area enough to save the data to be held in the HDD 28, the HDD driver 260 may save a part of the data to be held into the HDD 28 and leave a remaining part in the memory 26. In this case, the memory state control unit 240 may cause the memory area in which the data to be held remains to perform self-refresh and cause the memory area in which the data to be held does not exist to turn off.

In the above configuration, the transition to the hibernation state can be made efficiently. Hereinafter processing by the data relocation unit 220, the memory state control unit 240, the HDD driver 260 and so on is described in further detail with reference to FIG. 19.

Figure 19:
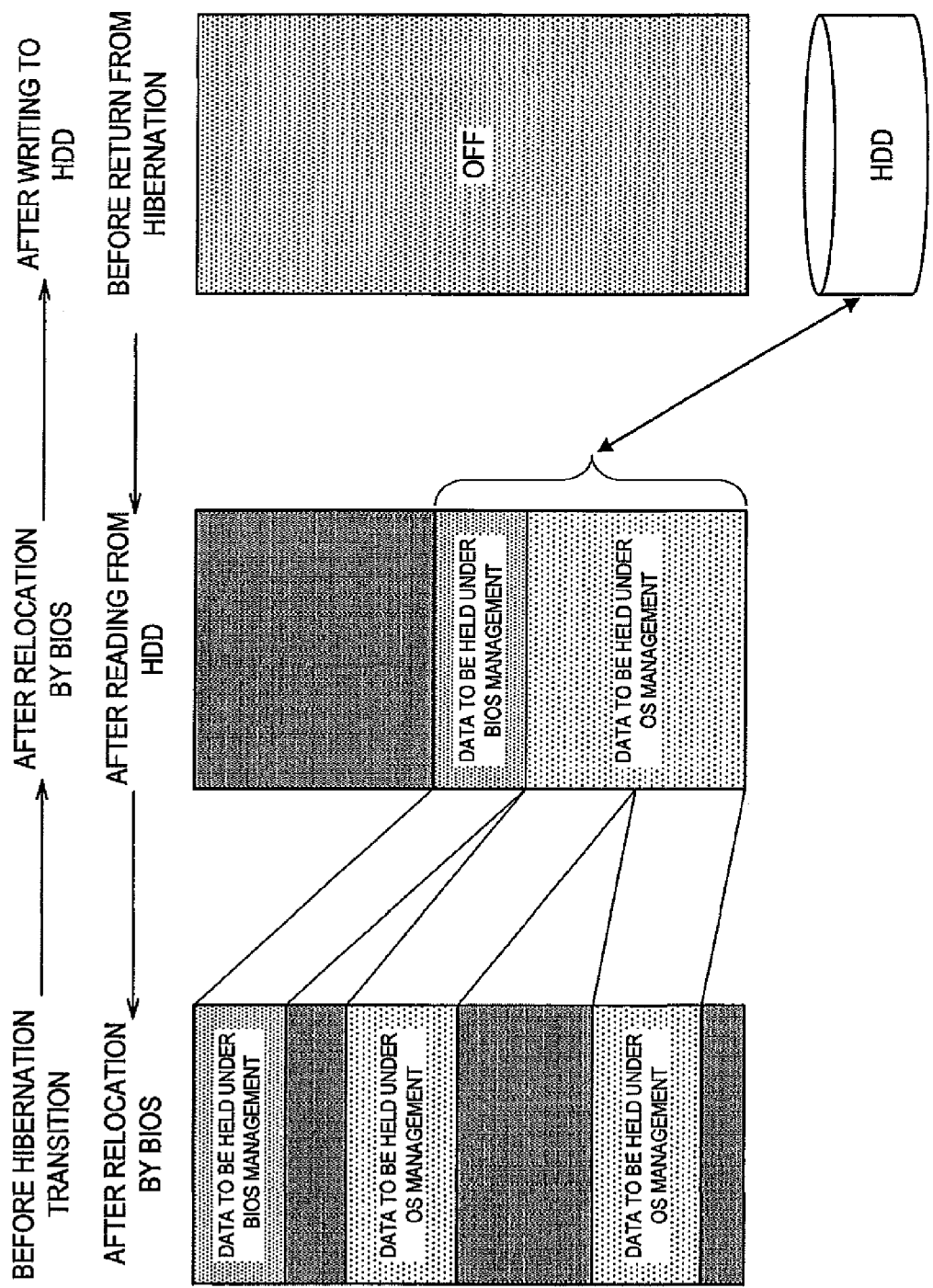
FIG. 19 is an explanatory diagram showing a specific example of processing performed at transition to hibernation state.

FIG. 19 is an explanatory diagram showing a specific example of processing performed at the transition to the hibernation state. When the data to be held is located scattered on the memory 26 as shown at the left of FIG. 19, the data relocation unit 220 changes the location of each data to be held so that the data to be held concentrates on one part of the memory 26 as shown at the middle of FIG. 19. Further, the data compression unit 230 compresses the data to be held, though not shown in FIG. 19.

After that, the HDD driver 260 saves the data to be held into the HDD 28 as shown at the right of FIG. 19. Then, the memory state control unit 240 gives an instruction to the power controller 32 so as to stop power supply to the memory as a whole. The information processing device 1 thereby makes transition to the hibernation state.

Further, at the time of returning from the hibernation state to the normal operation state, the HDD driver 260 loads the data to be held that has been saved into the HDD 28 back to the memory 26 as shown at the middle of FIG. 19. Then, the data relocation unit 220 changes the location of the data to be held in the memory 26 back to the same location as before the transition to the hibernation state. In this configuration, the location of the data to be held in the memory 26 can be back to the data location as grasped by the OS 100, and the information processing device 1 can thereby normally return to the normal operation state.

[4-2. Operations of BIOS According to Third Embodiment]

The operation of the BIOS 200 according to the third embodiment is described hereinafter with reference to FIG. 20. Note that the operation described in the first embodiment with reference to FIG. 8 may be applied to the operation of the OS 100 according to the third embodiment.

(Operation of BIOS 200 at Hibernation Transition)

Figure 20:
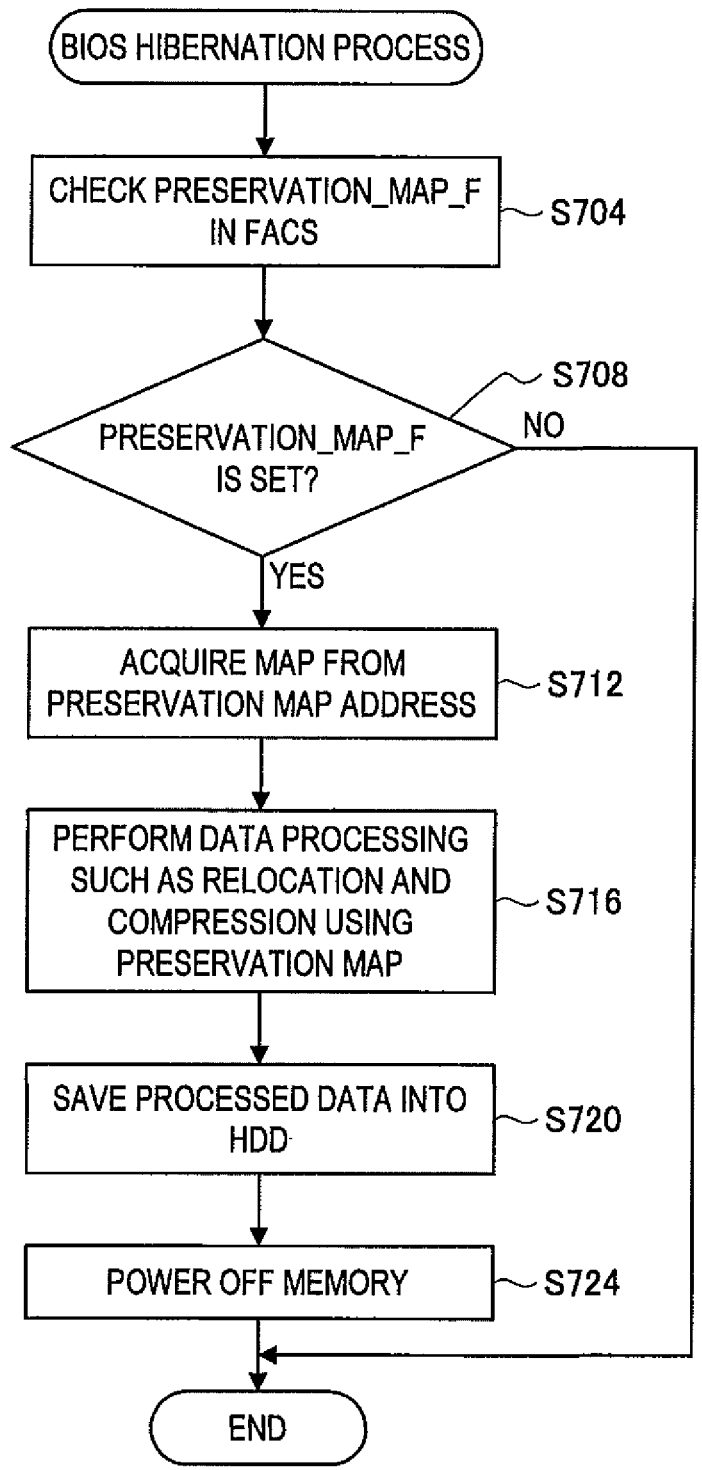
FIG. 20 is a flowchart showing an operation by BIOS at transition to hibernation state.

FIG. 20 is a flowchart showing the operation by the BIOS 200 at the transition to the hibernation state. Referring to FIG. 20, the data relocation unit 220 of the BIOS 200 first checks PRESERVATION_MAP_F in FACS (S704).

Then, when a flag is set to PRESERVATION_MAP_F (S708), the data relocation unit 220 acquires a preservation map based on the preservation map address in FACS (S712).

After that, the data relocation unit 220 changes the location of the data to be held, and the data compression unit 230 compresses the data to be held (S716).

Then, the HDD driver 260 saves the data to be held after processing by the data relocation unit 220 and the data compression unit 230 into the HDD 28 (S720). The memory state control unit 240 then gives an instruction to the power controller 32 so as to stop power supply to the memory 26 as a whole (S724). The memory 26 thereby turns off, and the information processing device 1 makes transition to the hibernation state.

As described above, according to the third embodiment, it is possible to efficiently save the data to be held into the HDD 28 and make transition to the hibernation state. For example, the time to save the data to be held into the HDD 28 and the time to load the data to be held from the HDD 28 back to the memory 26 can be shortened.

<5. Fourth Embodiment>

A fourth embodiment of the disclosure is described next. The fourth embodiment of the disclosure is different from the third embodiment in the function sharing of the OS 100 and the BIOS 200 as described below; however, it is possible to efficiently make transition to the hibernation state like the third embodiment.

[5-1. Functions of OS and BIOS According to Fourth Embodiment]

Figure 21:
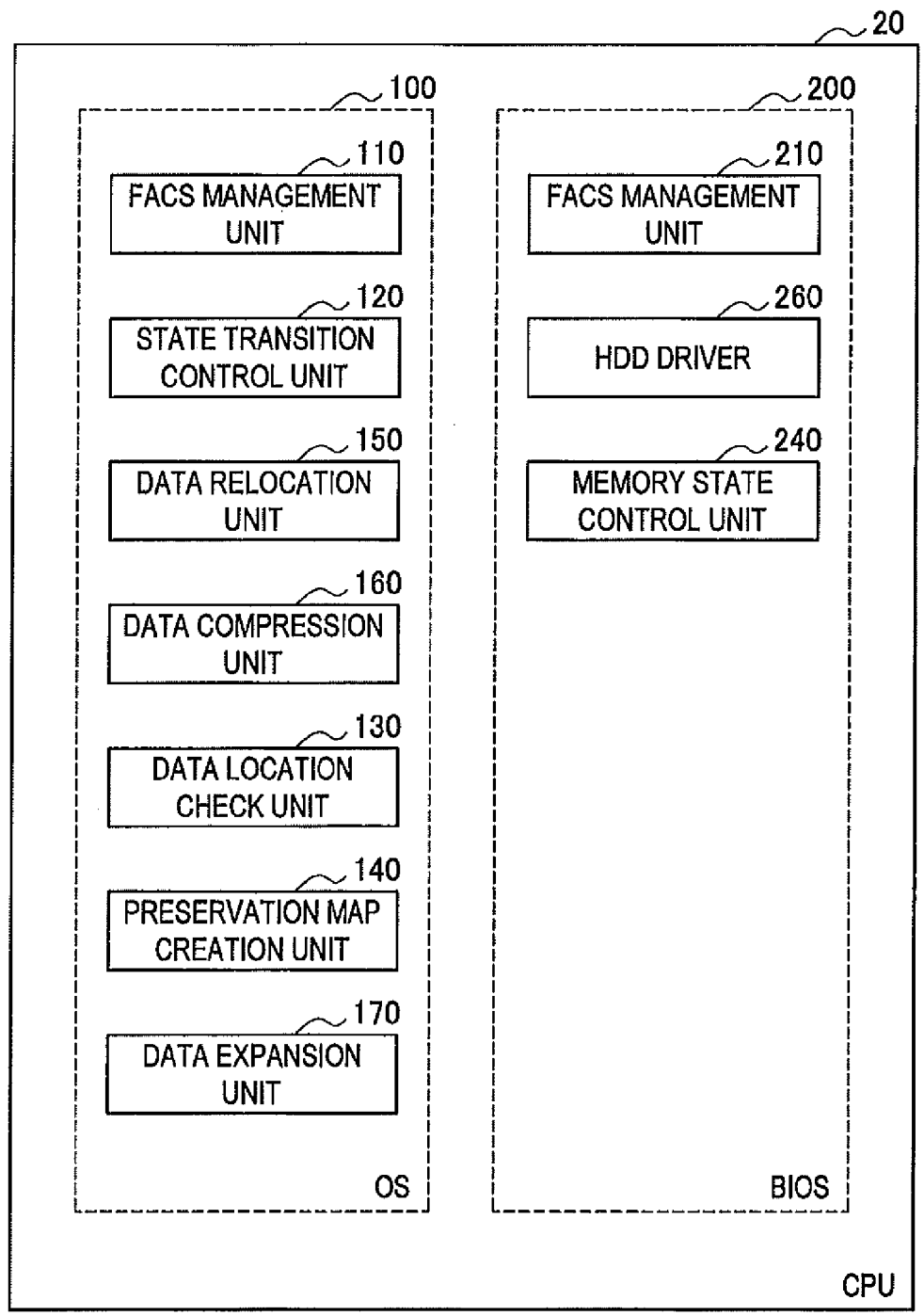
FIG. 21 is an explanatory diagram showing functions incorporated into OS and BIOS according to a fourth embodiment.

FIG. 21 is an explanatory diagram showing functions incorporated into an OS 100 and a BIOS 200 according to the fourth embodiment. Referring to FIG. 21, the OS 100 includes a FACS management unit 110, a state transition control unit 120, a data location check unit 130, a preservation map creation unit 140, a data relocation unit 150, a data compression unit 160, and a data expansion unit 170.

At the transition to the hibernation state also, the OS 100 creates a preservation map after performing data location change and compression in the same manner as in the second embodiment. Specifically, when a transition to the hibernation state is decided by the state transition control unit 120, the data relocation unit 150 changes the data location of the memory 26, and the data compression unit 160 compresses the data of the memory 26. Then, the data location check unit 130 checks the data location of the memory 26, and the preservation map creation unit 140 creates a preservation map. Note that there is a case where the BIOS 200 executes the transition to the hibernation state even when the state transition control unit 120 decides the transition to the suspend state. In this embodiment, even when the transition to the suspend state is decided by the state transition control unit 120, the preservation map creation unit 140 creates a preservation map, and the BIOS 200 can execute the transition to the hibernation state by referring to the preservation map.

Further, as shown in FIG. 21, the BIOS 200 according to the fourth embodiment includes a FACS management unit 210, a memory state control unit 240 and an HDD driver 260.

The HDD driver 260 checks PRESERVATION_MAP_F in FACS at the transition from the normal operation state to the hibernation state. Then, when a flag is set to PRESERVATION_MAP_F, that is, when the OS 100 has the function of creating a preservation map, the HDD driver 260 checks the preservation map address.

Then, the HDD driver 260 refers to the preservation map based on the preservation map address and checks the location of data to be held in the memory 26. Then, the HDD driver 260 saves the HDD driver 260 into the HDD 28.

After saving the data to be held into the HDD 28, the memory state control unit 240 performs power control of the memory 26 by giving an instruction to the power controller 32. Specifically, the memory state control unit 240 gives an instruction to the power controller 32 so as to stop power supply to the memory 26 as a whole. The information processing device 1 thereby makes transition to the hibernation state.

[5-2. Operations of BIOS According to Fourth Embodiment]

The operation of the BIOS 200 according to the fourth embodiment is described hereinafter with reference to FIG. 22. Note that the operation described in the second embodiment with reference to FIG. 16 may be applied to the operation of the OS 100 according to the fourth embodiment.

(Operation of BIOS 200 at Hibernation Transition)

Figure 22:
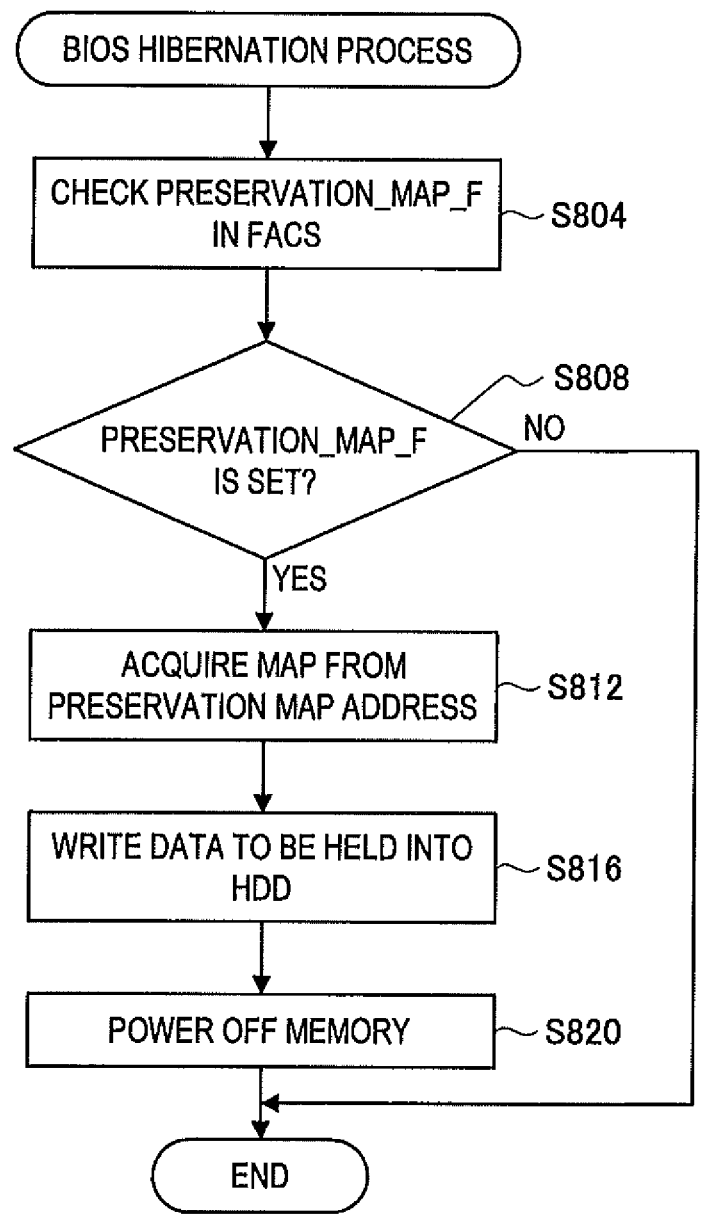
FIG. 22 is a flowchart showing an operation by BIOS at transition to hibernation state.

FIG. 22 is a flowchart showing the operation by the BIOS 200 at the transition to the hibernation state. Referring to FIG. 22, the HDD driver 260 of the BIOS 200 first checks PRESERVATION_MAP_F in FACS (S804).

Then, when a flag is set to PRESERVATION_MAP_F (S808), the HDD driver 260 acquires a preservation map based on the preservation map address in FACS (S812). After that, the HDD driver 260 saves data to be held into the HDD 28 (S816).

Then, the memory state control unit 240 gives an instruction to the power controller 32 so as to stop power supply to the memory 26 as a whole (S820). The memory 26 thereby turns off, and the information processing device 1 makes transition to the hibernation state.

As described in the fourth embodiment, change of data location and compression of data may be performed on the OS 100 side. In this case also, it is possible to shorten the time to save the data to be held into the HDD 28 and the time to load the data to be held from the HDD 28 back to the memory 26, just like in the third embodiment.

<6. Summary>

As described above, according to the respective embodiments of the disclosure, the BIOS 200 can perform power control of the memory 26 based on the preservation map that indicates the location of data to be held in the memory 26.

More specifically, according to the first and second embodiments of the disclosure, it is possible to further reduce power consumption by allowing some memory areas to perform self-refresh and stopping power supply to other memory areas in the suspend state.

Further, according to the third and fourth embodiments of the disclosure, it is possible to shorten the time taken to transition to the hibernation state and return from the hibernation state by selectively saving data stored in the memory 26 into the HDD 28 in the hibernation state.

The preferred embodiments of the present disclosure have been described above with reference to the accompanying drawings, whilst the present disclosure is not limited to the above examples, of course. It should be understood by those skilled in the art that various modifications, combinations, sub-combinations and alterations may occur depending on design requirements and other factors insofar as they are within the scope of the appended claims or the equivalents thereof.

Further, it is not always necessary to perform the steps in the processing of the OS 100 and the BIOS 200 of the specification in chronological order according to the sequence shown in the sequence chart or the flowcharts. For example, the steps in the processing of the OS 100 and the BIOS 200 may be processed in a difference sequence from the sequence shown in the flowcharts or may be processed in parallel.

Furthermore, it is possible to create a computer program that causes hardware such as the CPU 20 and the memory incorporated in the information processing device 1 to perform the equal functions to the OS 100 and the BIOS 200 described above. Further, a storage medium that stores such a computer program may be also provided.

What is claimed is:

1. An information processing device comprising:
   a memory;
   an OS that acquires location information of a plurality of data stored in a plurality of memory areas in the memory; and
   a BIOS that performs power control to cause the memory to transition to a power saving state with reference to the location information acquired by the OS, in which, for each of the memory areas, the location information includes information indicating whether the data thereof is data to be held that should be held in the power saving state in accordance with a result of a determination whether a necessity for holding the data is determinable, wherein, when the result indicates the necessity for holding the data is undeterminable, the location information indicates the result with a first indication which is other than (i) a second indication indicated when the result indicates the data is data to be held and (ii) a third indication indicated when the result indicates the data is not data to be held,
   wherein the BIOS includes a memory state control unit that performs power control of the memory to return the memory from the power saving state with reference to the location information acquired by the OS,
   in which at return from the power saving state, location of the hold data in the memory is changed back to a location in the memory before transition to the power saving state.

2. The information processing device according to claim 1, wherein
   the memory state control unit performs power control of the memory with respect to each of the plurality of memory areas.

3. The information processing device according to claim 2, wherein
   the memory state control unit makes control to perform self-refresh for memory areas where hold data to be held in the power saving state exists and not to perform self-refresh for other memory areas among the plurality of memory areas.

4. The information processing device according to claim 3, wherein
   the BIOS includes a location change unit that changes a location of the hold data in the memory so as to reduce a number of memory areas in the memory storing the hold data with reference to the location information acquired by the OS, and
   the memory state control unit performs power control of the memory based on the location of the hold data after location change by the location change unit.

5. The information processing device according to claim 4, wherein
   the BIOS includes a compression unit that compresses the hold data, and
   the memory state control unit performs power control of the memory based on the location of the hold data after location change by the location change unit and data compression by the compression unit.

6. The information processing device according to claim 5, wherein
   at return from the power saving state, the location change unit changes the location of the hold data back to the location before transition to the power saving state.

7. The information processing device according to claim 3, wherein
   the OS includes
   a location change unit that changes a location of the hold data in the memory so as to reduce a number of memory areas in the memory storing the hold data, and
   a data location check unit that acquires location information of data after location change by the location change unit.

8. The information processing device according to claim 7, wherein
   the OS includes a compression unit that compresses the hold data, and
   the data location check unit acquires location information of data after location change by the location change unit and data compression by the compression unit.

9. The information processing device according to claim 8, wherein
   at return from the power saving state, the location change unit changes the location of the hold data back to the location before transition to the power saving state.

10. The information processing device according to claim 1, further comprising:
    a nonvolatile storage medium,
    wherein the BIOS includes
    a recording control unit that records hold data to be held in the power saving state into the nonvolatile storage medium by using the location information acquired by the OS, and
    wherein the memory state control unit stops power supply to the memory and causes the memory to transition to the power saving state.

11. The information processing device according to claim 10, wherein
    the BIOS includes a location change unit that concentrates the hold data on one part of the memory with reference to the location information acquired by the OS, and
    the recording control unit performs control to record the hold data concentrated on one part of the memory by the location change unit into the nonvolatile storage medium.

12. The information processing device according to claim 11, wherein
   the BIOS includes a compression unit that compresses the hold data, and
   the recording control unit performs control to record the hold data after processing by the location change unit and the compression unit into the nonvolatile storage medium.

13. The information processing device according to claim 12, wherein
   at return from the power saving state, the location change unit changes the location of the hold data back to the location before transition to the power saving state.

14. The information processing device according to claim 10, wherein
   the OS includes
      a location change unit that concentrates the hold data on one part of the memory, and
      a data location check unit that acquires location information of data after processing by the location change unit.

15. The information processing device according to claim 14, wherein
   the OS includes a compression unit that compresses the hold data, and
   the data location check unit acquires location information of data after processing by the location change unit and the compression unit.

16. The information processing device according to claim 3, wherein
   the location information contains information indicating a located position of each data in the memory and information indicating whether each data is the hold data.

17. The information processing device according to claim 1, wherein
   the BIOS further includes a flag setting unit that sets a flag indicating presence of a function to perform power control based on the location information, and
   the OS acquires the location information when the flag is set by the BIOS.

18. The information processing device according to claim 1, wherein
   the OS further includes a flag setting unit that sets a flag indicating whether the location information is acquired at transition to the power saving state, and
   the BIOS performs power control based on the location information when the flag is set by the OS.

19. A power control method comprising;
   acquiring location information of a plurality of data stored in a plurality of memory areas in a memory included in an information processing device by an OS; and
   performing power control to cause the memory to transition to a power saving state by a BIOS with reference to the location information acquired by the OS,
   in which, for each of the memory areas, the location information includes information indicating whether the data thereof is data to be held that should be held in the power saving state in accordance with a result of a determination whether a necessity for holding the data is determinable, wherein, when the result indicates the necessity for holding the data is undeterminable, the location information indicates the result with a first indication which other than (i) a second indication indicated when the result indicates the data is data to be held and (ii) a third indication indicated when the result indicates the data is not data to be held,
   in which the power control is performed to return the memory from the power saving state with reference to the location information acquired by the OS,
   in which at return from the power saving state, location of the hold data in the memory is changed back to a location in the memory before transition to the power saving state.

20. A program on a non-transitory recording medium causing a computer to execute;
   acquiring location information of a plurality of data stored in a plurality of memory areas in a memory by an OS; and
   performing power control to cause the memory to transition to a power saving state by a BIOS with reference to the location information acquired by the OS,
   in which, for each of the memory areas, the location information includes information indicating whether the data thereof is data to be held that should be held in the power saving state in accordance with a result of a determination whether a necessity for holding the data is determinable, wherein, when the result indicates the necessity for holding the data is undeterminable, the location information indicates the result with a first indication which is other than (i) a second indication indicated when the result indicates the data is data to be held and (ii) a third indication indicated when the result indicates the data is not data to be held,
   in which the power control is performed to return the memory from the power saving state with reference to the location information acquired by the OS,
   in which at return from the power saving state, location of the hold data in the memory is changed back to a location in the memory before transition to the power saving state.

* * * * *